United States Patent
Boyd et al.

(10) Patent No.: US 8,274,517 B2
(45) Date of Patent: Sep. 25, 2012

(54) SYSTEMS AND METHODS FOR DOWNLOADING ALGORITHMIC ELEMENTS TO A COPROCESSOR AND CORRESPONDING TECHNIQUES

(75) Inventors: Charles N. Boyd, Woodinville, WA (US); Michele B. Boland, Seattle, WA (US); Michael A. Toelle, Bellevue, WA (US); Anantha Rao Kancherla, Redmond, WA (US); Amar Patel, Redmond, WA (US); Iouri Tarassov, Bellevue, WA (US); Stephen H. Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 10/986,586

(22) Filed: Nov. 12, 2004

(65) Prior Publication Data

US 2005/0122330 A1 Jun. 9, 2005

Related U.S. Application Data

(60) Provisional application No. 60/520,253, filed on Nov. 14, 2003.

(51) Int. Cl.
*G06T 1/00* (2006.01)
*G06T 15/00* (2011.01)

(52) U.S. Cl. ..................................... 345/522

(58) Field of Classification Search .................. 345/522
See application file for complete search history.

(56) References Cited

U.S. PATENT DOCUMENTS

| | | | |
|---|---|---|---|
| 5,793,374 A * | 8/1998 | Guenter et al. | 345/426 |
| 6,262,740 B1 * | 7/2001 | Lauer et al. | 345/424 |
| 6,476,807 B1 | 11/2002 | Duluk et al. | |
| 6,624,818 B1 | 9/2003 | Mantor et al. | |
| 6,765,584 B1 * | 7/2004 | Wloka et al. | 345/584 |
| 6,771,264 B1 * | 8/2004 | Duluk et al. | 345/426 |
| 6,819,325 B2 | 11/2004 | Boyd et al. | |
| 6,825,843 B2 | 11/2004 | Allen et al. | |
| 6,828,980 B1 * | 12/2004 | Moreton et al. | 345/582 |
| 6,891,548 B2 * | 5/2005 | Alcorn et al. | 345/586 |
| 6,933,947 B2 | 8/2005 | Platt et al. | |

(Continued)

OTHER PUBLICATIONS

U.S. Appl. No. 10/987,120: Final Rejection, Dec. 8, 2008, 17 pages.

(Continued)

*Primary Examiner* — Aaron M Richer
(74) *Attorney, Agent, or Firm* — Woodcock Washburn LLP

(57) ABSTRACT

Systems and methods for downloading algorithmic elements to a coprocessor and corresponding processing and communication techniques are provided. For an improved graphics pipeline, the invention provides a class of co-processing device, such as a graphics processor unit (GPU), providing improved capabilities for an abstract or virtual machine for performing graphics calculations and rendering. The invention allows for runtime-predicated flow control of programs downloaded to coprocessors, enables coprocessors to include indexable arrays of on-chip storage elements that are readable and writable during execution of programs, provides native support for textures and texture maps and corresponding operations in a vertex shader, provides frequency division of vertex streams input to a vertex shader with optional support for a stream modulo value, provides a register storage element on a pixel shader and associated interfaces for storage associated with representing the "face" of a pixel, provides vertex shaders and pixel shaders with more on-chip register storage and the ability to receive larger programs than any existing vertex or pixel shaders and provides 32 bit float number support in both vertex and pixel shaders.

67 Claims, 20 Drawing Sheets

U.S. PATENT DOCUMENTS

| | | | |
|---|---|---|---|
| 6,947,047 B1 | 9/2005 | Moy et al. | |
| 7,002,591 B1* | 2/2006 | Leather et al. | 345/582 |
| 7,006,101 B1 | 2/2006 | Brown et al. | |
| 7,009,615 B1* | 3/2006 | Kilgard et al. | 345/506 |
| 7,015,913 B1 | 3/2006 | Lindholm et al. | |
| 7,038,685 B1 | 5/2006 | Lindholm | |
| 7,145,565 B2 | 12/2006 | Everitt et al. | |
| 7,151,453 B2 | 12/2006 | Ebert | |
| 7,508,448 B1* | 3/2009 | Lew et al. | 348/448 |
| 7,609,273 B1 | 10/2009 | Donovan | |
| 7,623,132 B1 | 11/2009 | Bastos et al. | |
| 7,643,032 B2 | 1/2010 | Wetzel et al. | |
| 2002/0130863 A1* | 9/2002 | Baldwin | 345/420 |
| 2004/0012597 A1* | 1/2004 | Zatz et al. | 345/501 |
| 2004/0012600 A1 | 1/2004 | Deering et al. | |
| 2004/0066385 A1 | 4/2004 | Kilgard et al. | |
| 2004/0169651 A1 | 9/2004 | Everitt et al. | |
| 2005/0043619 A1* | 2/2005 | Sumanaweera et al. | 600/437 |
| 2005/0122331 A1 | 6/2005 | Boyd et al. | |
| 2005/0122332 A1 | 6/2005 | Boyd et al. | |
| 2005/0122334 A1 | 6/2005 | Boyd et al. | |
| 2005/0259103 A1 | 11/2005 | Kilgard et al. | |
| 2006/0092168 A1 | 5/2006 | Wetzel et al. | |
| 2008/0198169 A1 | 8/2008 | Boyd et al. | |
| 2009/0256849 A1 | 10/2009 | Boland et al. | |

OTHER PUBLICATIONS

U.S. Appl. No. 10/987,120: Final Rejection, May 12, 2010, 22 pages.
U.S. Appl. No. 10/987,120: Non-Final Rejection, Apr. 16, 2008, 16 pages.
U.S. Appl. No. 10/987,120: Non-Final Rejection, Sep. 1, 2009, 23 pages.
U.S. Appl. No. 10/987,144: Final Rejection, Feb. 25, 2010, 27 pages.
U.S. Appl. No. 10/987,144: Final Rejection, Jul. 31, 2009, 23 pages.
U.S. Appl. No. 10/987,144: Final Rejection, Nov. 16, 2007, 24 pages.
U.S. Appl. No. 10/987,144: Non-Final Rejection, Jan. 26, 2009, 12 pages.
U.S. Appl. No. 10/987,144: Non-Final Rejection, Jul. 25, 2008, 9 pages.
U.S. Appl. No. 10/987,144: Non-Final Rejection, May 30, 2007, 18 pages.
U.S. Appl. No. 10/987,686: Final Rejection, Jun. 8, 2009, 29 pages.
U.S. Appl. No. 10/987,686: Non-Final Rejection, Aug. 21, 2008, 30 pages.
U.S. Appl. No. 10/987,686: Non-Final Rejection, May 27, 2010, 7 pages.
U.S. Appl. No. 12/112,676: Non-Final Rejection, Feb. 4, 2010, 8 pages.
U.S. Appl. No. 12/112,676: Non-Final Rejection, Jul. 19, 2010, 10 pages.
"List of Computer Science Publications at University of Utah", www.sci.utah.edu/-cscheid/pubs, CIBC Publications, accessed Apr. 23, 2010, 1 page.
"List of Publications in Revista de Informatica Teórica e Aplicada", RITA, www.inf.ufrgs.br/revista/Numpub.html, Magazine Theoretical and Applied Informatics—UFRGS SEER, accessed Apr. 23, 2010, 28 pages.
"Video Cards Exposed", CPU Computer Power User article, Jan. 2003, 3(1), 48-62 (in print issue).
ATI, "Smartshader Technology White Paper", ATI Technologies, Inc., (no month available) 2001, 1-14.
Comba et al., "Computation on GPUs: From a Programmable Pipeline to an Efficient Stream Processor", Revista de Informatica Teórica e Aplicada, RITA, Aug. 2003, X(1), 41-70.
Ecker, "Programmable Graphics Pipeline Architectures", XEngine, Mar. 24, 2003, 1-30.
Engel, "ShaderX$^2$: Introductions & Tutorials with Directx 9", Wordware Publishing Inc., Aug. 2003, 393 pages.
Equipe Tom's Hardware, "NV3x Exact Graphics: The Main Concepts of the Next Generation of 3D", www.tomshardware.com/cn/53,review-53-5.html, Siggraph 2002 Show report: Nvidia and the world an enemy, Aug. 7, 2002, 6 pages.
Fernando et al., "Programming Graphics Hardware", Nvidia Corporation, The Eurographics Association, (no month available) 2004, 1-17.
Schröcker, "Register Combiners", Mar. 21, 2002, 1 page.
Wikipedia, "Dxdiag: DirectX Description", www.en.wikipedia.org-wiki-DxDiag, accessed Jul. 12, 2010, 2 pages.
Wikipedia, "Pixel Shader Description", www.en.wikipedia.org-wiki-Pixel_shader, accessed Jul. 12, 2010, 4 pages.
Wikipedia, "High Level Shader Language description", www.en.wikipedia.org-wikiHigh_Level_Shader_Language, accessed Jul. 12, 2010, 3 pages.
"Surface Normal", Wikipedia, the free encyclopedia, http://en.wikipedia.org/wiki/Surface_normal, 2011.
U.S. Appl. No. 12/112,676: Non-Final Office Action, Jan. 10, 2012.

* cited by examiner

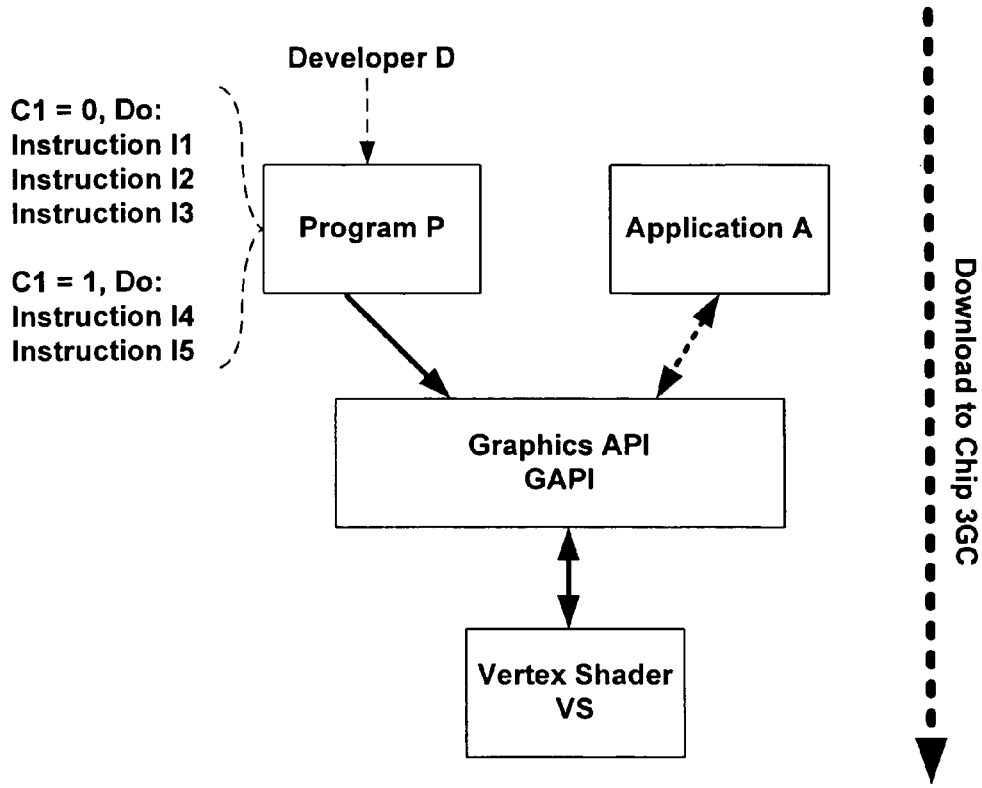
FIG. 1A – Prior Art
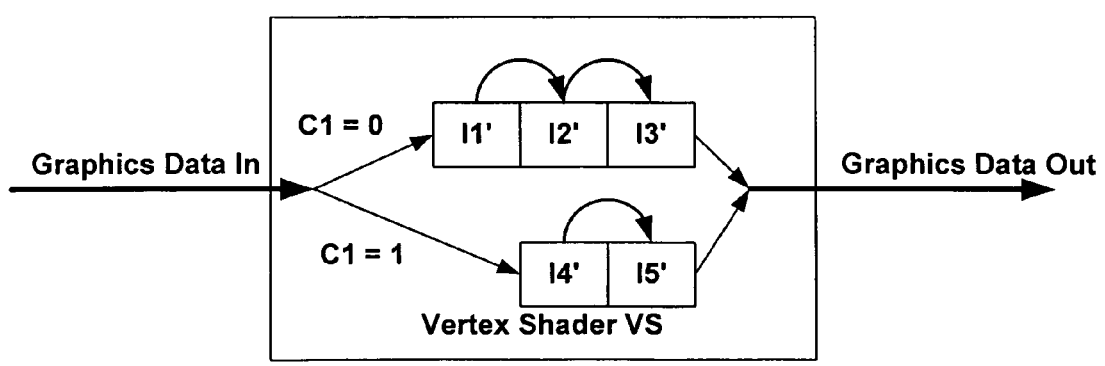
FIG. 1B – Prior Art

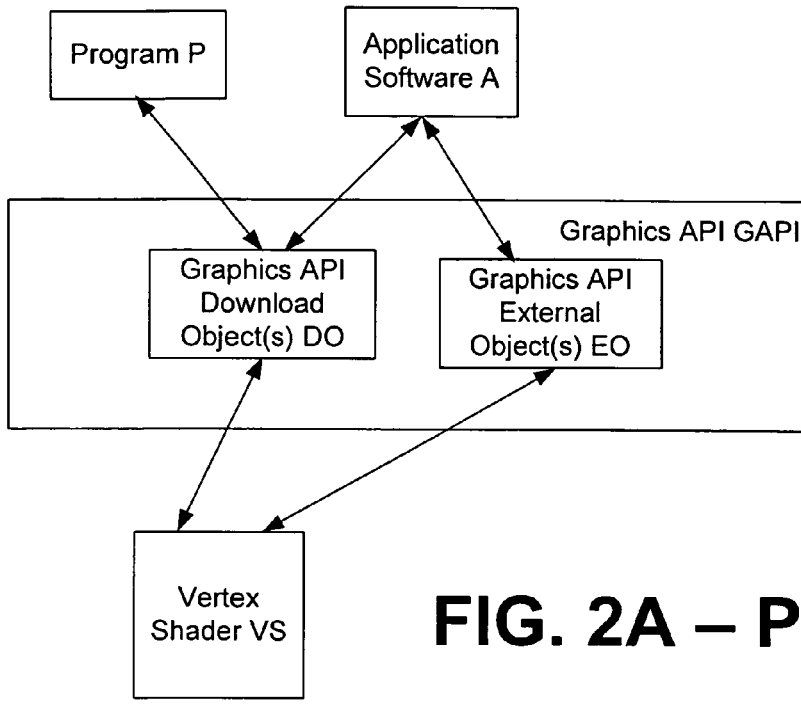
FIG. 2A – Prior Art
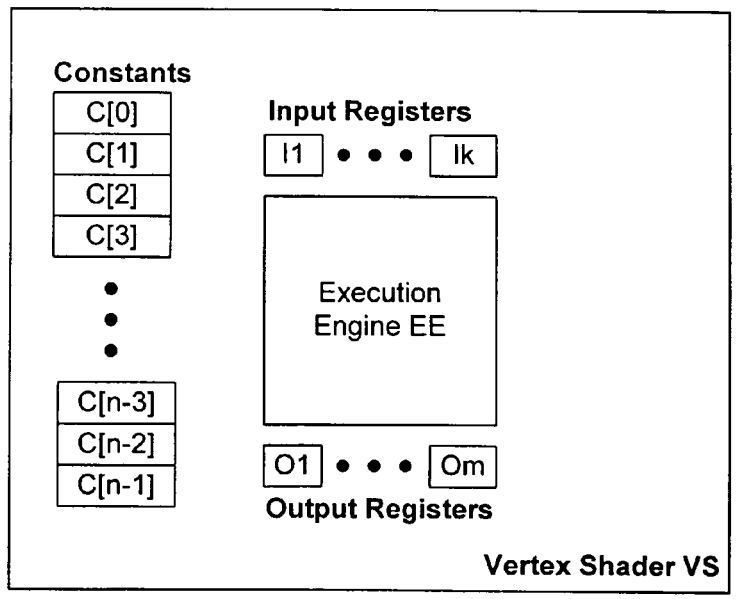
FIG. 2B – Prior Art

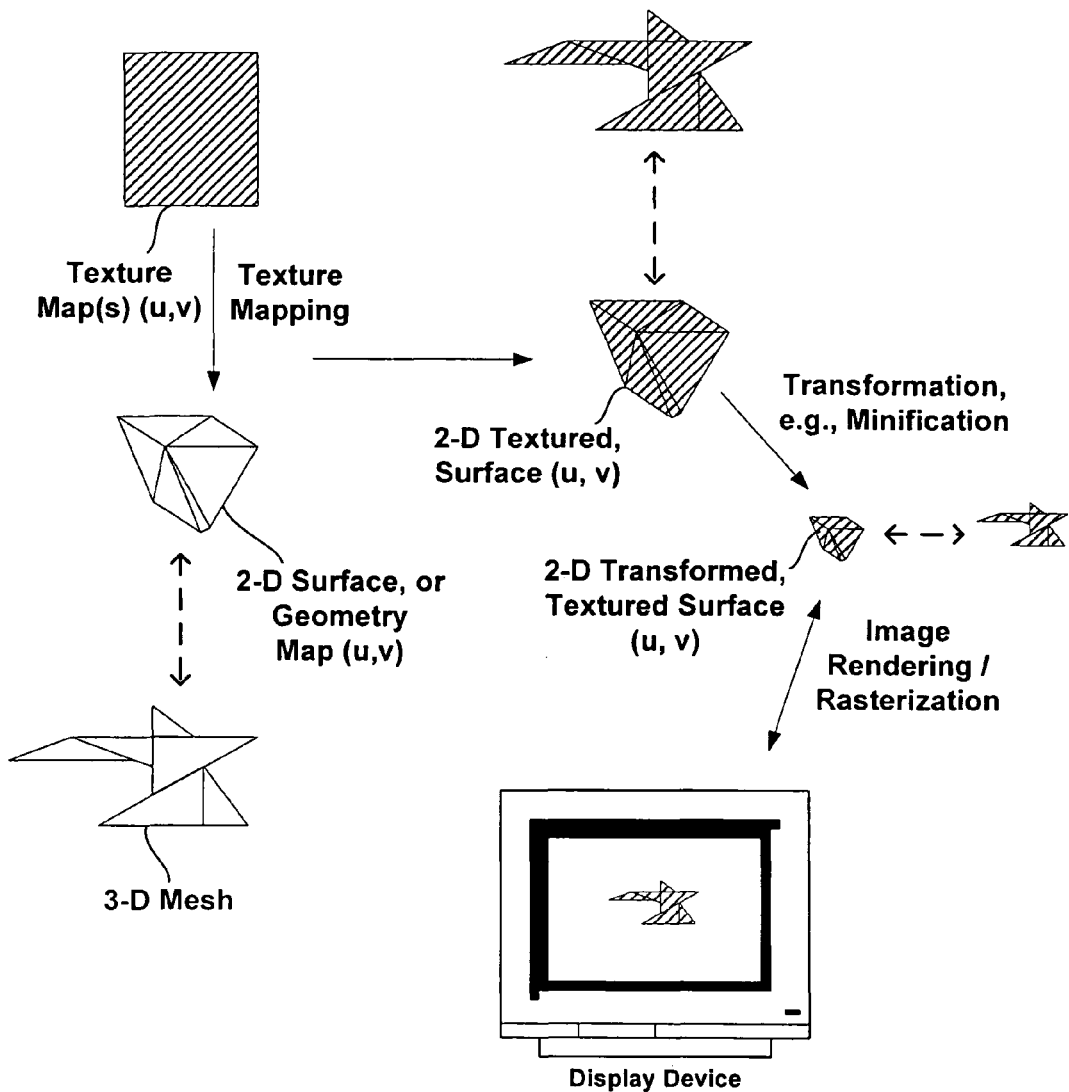
FIG. 3A - Prior Art
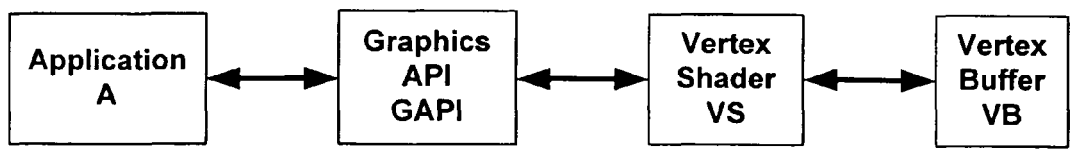
FIG. 3B – Prior Art

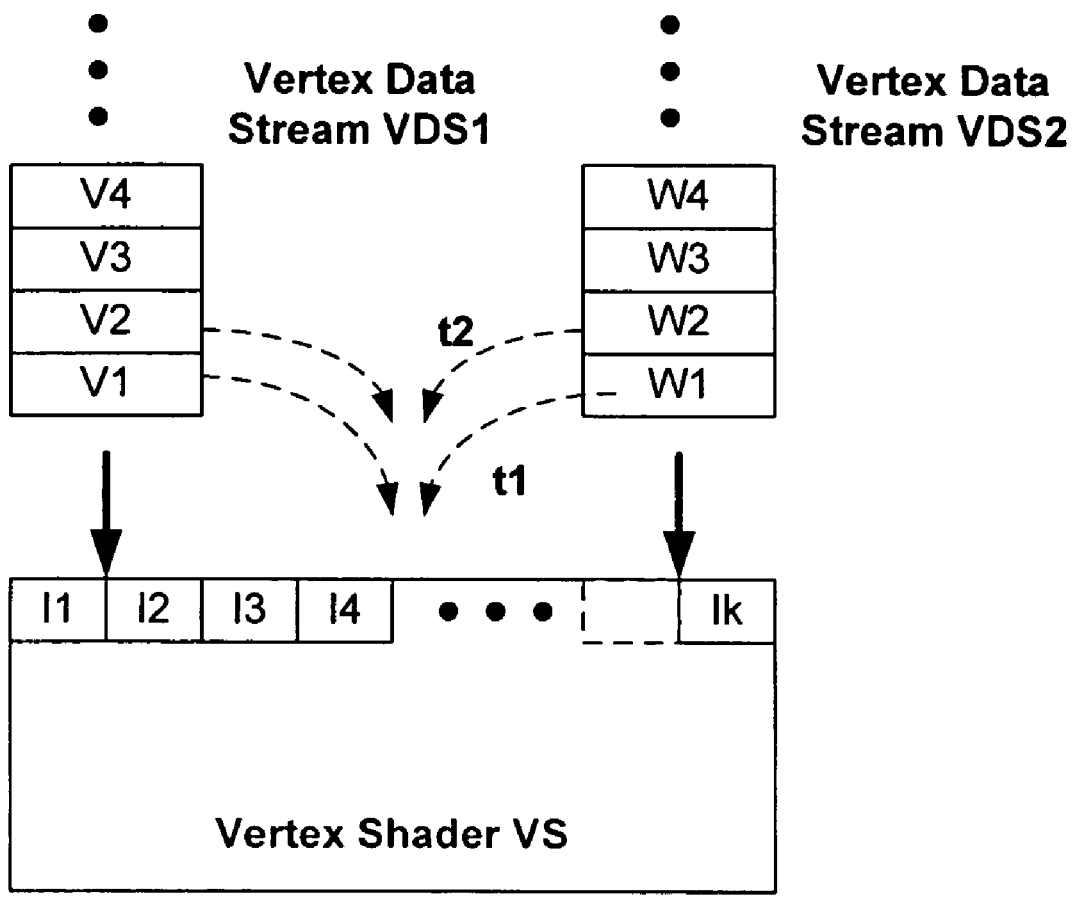
FIG. 4 - Prior Art

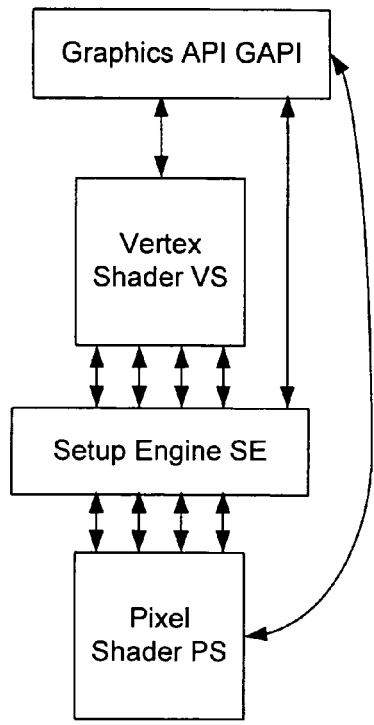
**FIG. 5A
Prior Art**
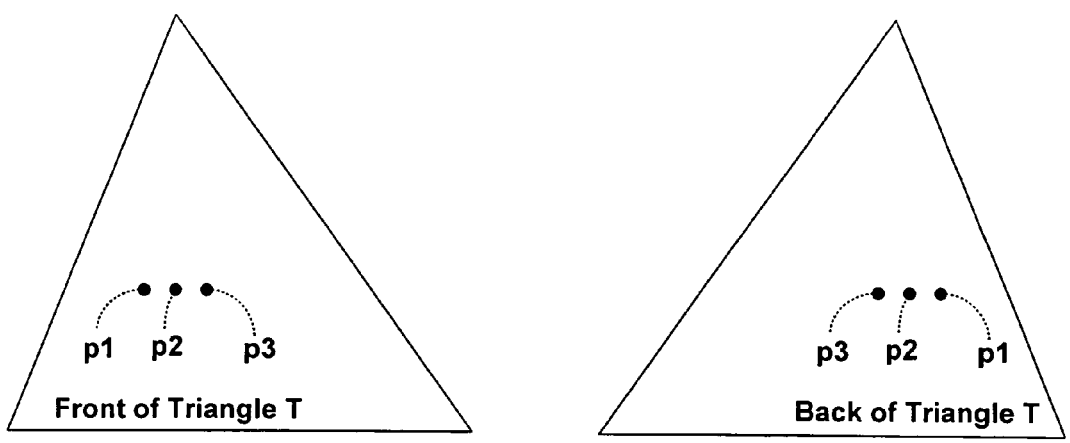
FIG. 5B - Prior Art

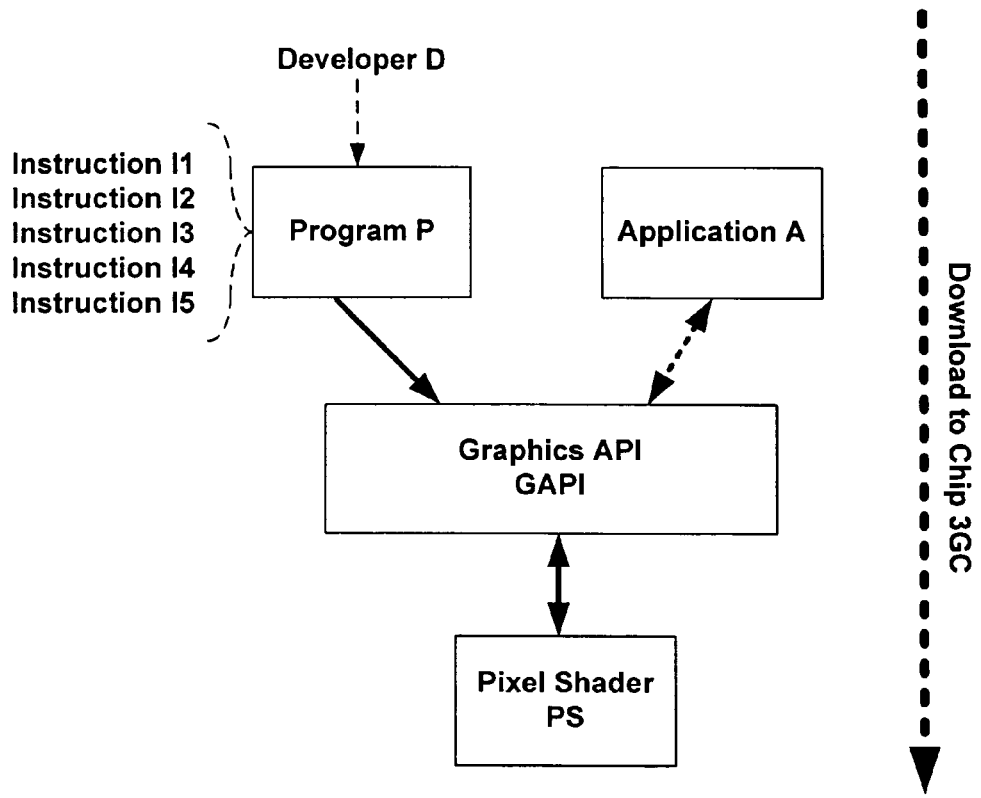
FIG. 6A – Prior Art
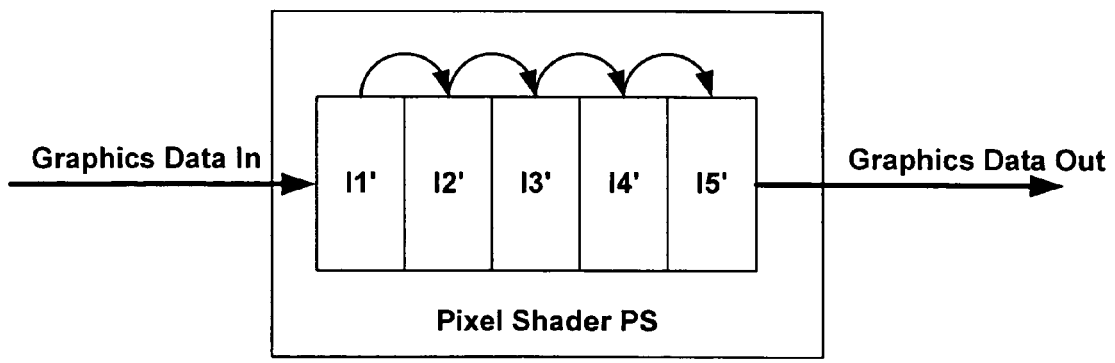
FIG. 6B – Prior Art

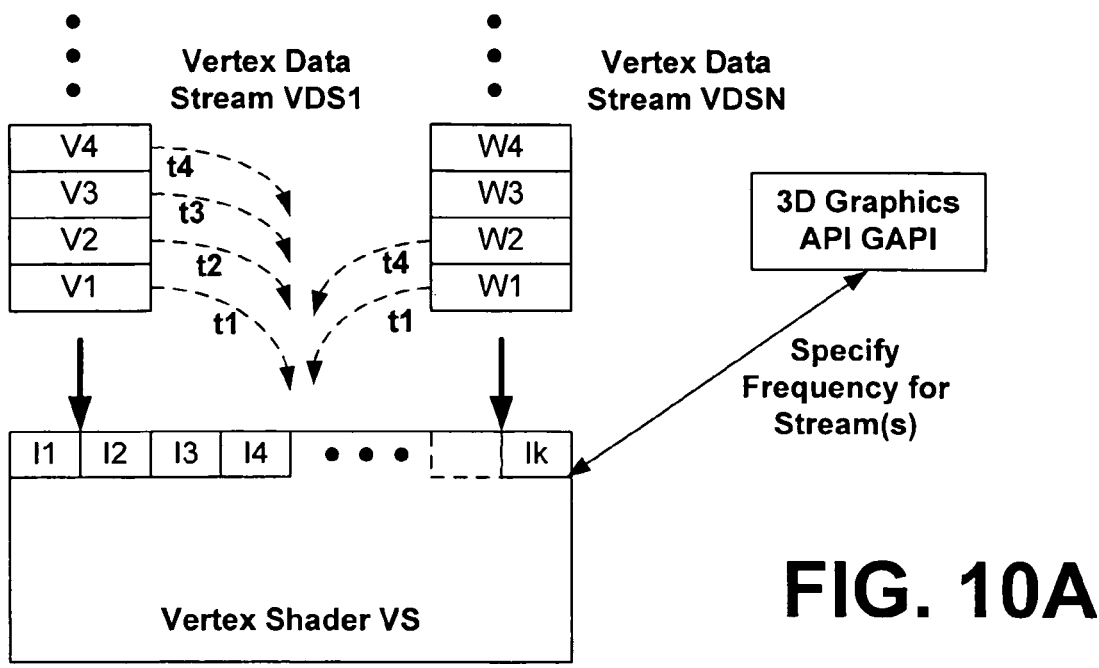
FIG. 10A
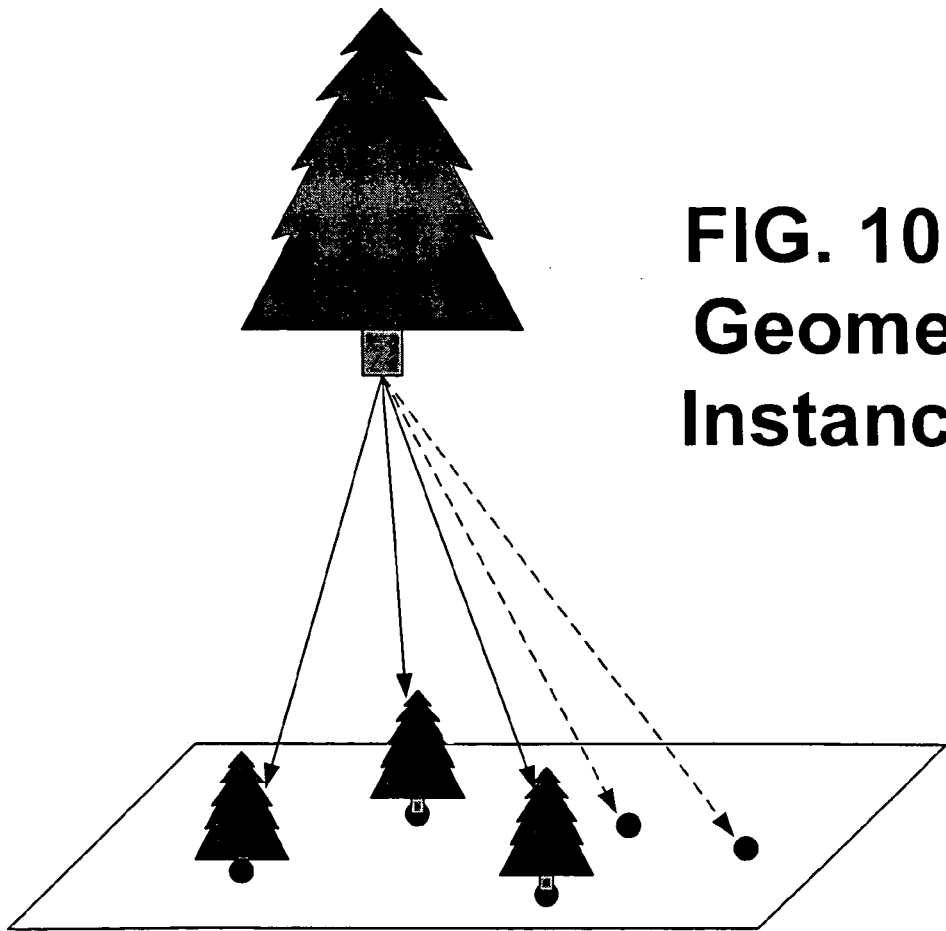
FIG. 10B – Geometry Instancing

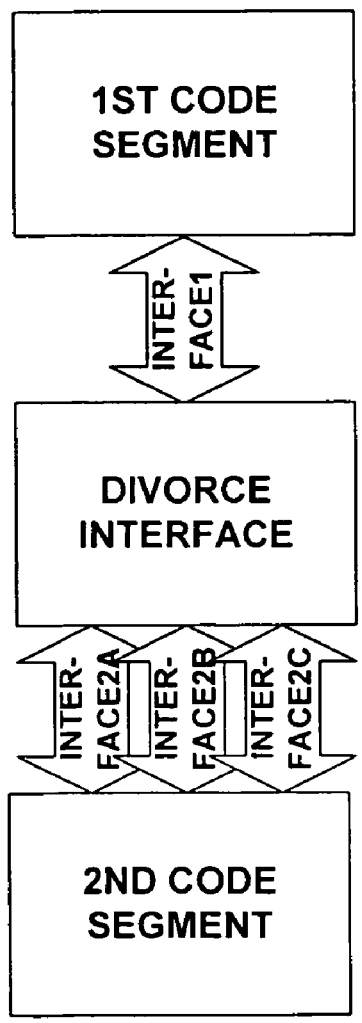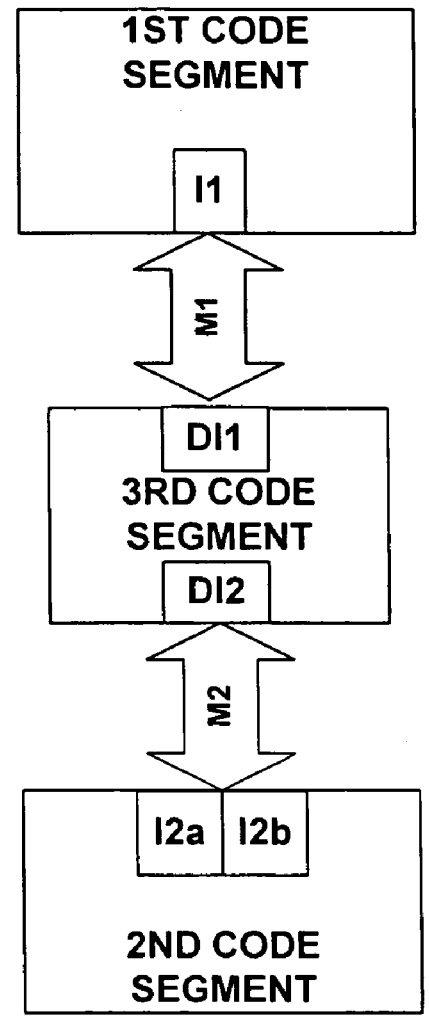
FIGURE 18A                    FIGURE 18B

SYSTEMS AND METHODS FOR DOWNLOADING ALGORITHMIC ELEMENTS TO A COPROCESSOR AND CORRESPONDING TECHNIQUES

CROSS REFERENCE TO RELATED APPLICATIONS

This application claims the benefit of U.S. Provisional Application No. 60/520,253 filed Nov. 14, 2003, which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001-2003, Microsoft Corp.

FIELD OF THE INVENTION

The present invention provides systems and methods relating to graphics interface(s) as a layer between applications/application developers and a more flexible graphics pipeline that renders and processes graphics data, and to corresponding hardware improvements.

BACKGROUND OF THE INVENTION

For the vast majority of applications, application programmers rely on or utilize some form of software interface for interactions between a host system, such as the host system of a computer, and its associated subsystems, such as a computer's graphics subsystem. For graphics applications, developers or programmers typically utilize a graphics software interface, such as a 3D graphics application programming interface (API), to facilitate the interaction with constituent parts of a graphics system. For instance, a developer might develop a graphics application that makes and receives calls to and from the graphics API in order to achieve some result pertaining to a graphics effect applied to graphics data. Programmers typically rely on software interfaces to graphics processing units (GPUs), peripherals and other specialized devices so that they can focus on the operational specifics of their application and the artistry of the graphics content rather than on the specifics of controlling a particular device or the algorithmic details associated with generating certain graphics objects or transforming those objects according to a particular effect. Programmers also rely on software interfaces so that their efforts are not duplicated from application to application, i.e., so that function calls or interfaces which are likely to be useful to multiple developers or likely to be applicable to various graphics scenarios, such as "Create Triangle," "Fill in Object with a Specified Solid Color," Stretch/Scale Rectangle," etc. can re-used. However, even after generations of software interfaces, there are certain aspects of today's software interfaces that can be improved.

Historically, graphics peripherals, integrated circuits (ICs) and other specialized graphics hardware designed for specific tasks, e.g., special purpose co-processing chips such as GPUs, have been better than the host processor of a host computing system at performing certain types of functions. For instance, video cards generally include special purpose hardware for copying and processing pixels and vertices faster than the central processing unit (CPU). So, historically, for a PC having a host system with a CPU and a graphics subsystem having a GPU, when any sort of graphics "thinking" was involved, the CPU handled the processing and when repetitive number crunching of large arrays of data was implicated, the GPU was called upon for processing. However, changes in graphics technology have occurred that have transformed the traditionally fixed function graphics pipeline into a more flexible entity.

For instance, hereby incorporated by reference, commonly assigned copending U.S. patent application Ser. No. 09/796,577, filed Mar. 1, 2001, entitled "Method and System for Defining and Controlling Algorithmic Elements in a Graphics Display System," relates to systems and methods for enabling programmability of a 3D graphics chip, wherein programming or algorithmic elements written by the developer can be downloaded to the chip, thereby programming the chip to perform those algorithms. As described, a developer writes a routine representing algorithmic element(s), wherein the routine is downloadable to the 3D graphics chip and then downloads the algorithmic element(s) to the programmable chip. Alternatively, the developer chooses from a preexisting set of algorithmic elements that are provided in connection with the API itself, or specifies the location of an otherwise existing routine. The routine adheres to a specific format for packing up the algorithmic element(s), or instructions, for implementation by the 3D graphics chip. In one embodiment, the developer packs the instruction set into an array of numbers, by referring to a list of 'tokens' understood by the 3D graphics chip. This array of numbers in turn is mapped correctly to the 3D graphics chip for implementation of the algorithmic element(s) by the 3D graphics chip. The architecture of the '577 application enables the developer to be flexible when defining the computation to be performed by the chip, while simultaneously allowing the developer to leverage the power and performance advantages provided by the 3D graphics chip.

Vertex and pixel shaders, which may be implemented with software or hardware or with a combination of both, are specialized components of a graphics subsystem that include specialized functionality for the processing of pixels, vertices, or other graphics data, so as to perform specialized operations, such as lighting and shading, and other transformations upon graphics data. In this regard, vertex and pixel shaders are two types of procedural shaders that have evolved to possess programmable functionality, e.g., as described in the '577 application.

Additional background relating to vertex and pixel shaders can be found in commonly assigned copending U.S. patent application Ser. No. 09/801,079, filed Mar. 6, 2001, entitled "API Communications for Vertex and Pixel Shaders," hereby incorporated into the present disclosure by reference. Briefly, the '079 application is directed to a three dimensional (3-D) graphics application programming interface (API) that provides improved communications between application developers and hardware rendering devices, such as procedural shaders. In particular, the '079 application is directed to improved API communications for host interaction with procedural shaders, such as vertex and pixel shaders, having local registers. The API communications of the '079 application advantageously expose various on-chip graphical algorithmic elements, while hiding the details of the operation of vertex shaders and pixel shaders from the developer. Advantageously, the procedural shaders and corresponding communications do not access the main memory or stack on the host system, but rather perform their operations efficiently with respect to a set of local registers. For the particular graphical algorithmic elements exposed, the graphics subsystem and corresponding interfaces of the '079 application allow for an efficient instruction set with numerous performance advantages, including faster accessing and processing of data as a result of bypassing the host system memory or stack.

As is apparent from the above, advances in hardware, such as procedural shaders, and graphics interfaces and algorithms have been revolutionizing the way graphics platforms operate. Generally speaking, however, current 3D graphics chips on the market can still be made more flexible and efficient, i.e., room for improvement still exists, both with respect to vertex shaders and pixel shaders.

For instance, on the vertex shader side of the graphics pipeline, while programs, i.e., algorithmic element(s) packaged as tokenized set(s) of instructions, currently can be downloaded to a graphics chip, the flow represented by a program performed by the graphics chip must be static. While such static flow may include branches, the branches themselves are fixed and may not be predicated upon a characteristic only known at runtime, i.e., any branches that may currently exist in a program downloaded to a vertex shader are predicated upon pre-set constants, such that all data fed to the vertex shader is processed in exactly the same way until the corresponding program is unloaded.

For instance, as illustrated in FIG. 1A, a developer D (or a software application A) can specify a program P having exemplary instructions I1 to I5 to a graphics API GAPI for download to the graphics chip, such as vertex shader VS, in order to program the graphics chip to perform the algorithms represented by the program P. Once the program P is downloaded to vertex shader VS, however, i.e., once vertex shader VS is programmed with program P, graphics data processed by vertex shader VS must be processed according to the algorithms I1' to I5' represented by or corresponding to instructions I1 to I5. In this simple example, the goal of the illustrated program P is to process black pixels in one way (I1, I2 and I3), and white pixels in another way (I4 and I5). However, once the program is loaded into vertex shader VS, there can be no branching taking place upon a characteristic or variable of the runtime system which can be limiting.

While the ability to define a static process flow for all graphics data to be processed according to algorithms I1' to I5' on the graphics chip is beneficial, currently, the static definition must remain for the duration of processing according to program P, i.e., until the processing is stopped and another program providing a different static computational flow is downloaded to the vertex shader VS for further processing of graphics data.

As illustrated in FIG. 1B, represented by the arrows illustrating the computational flow process performed on the graphics data, the processing that occurs for each data point of the graphics data streamed through the graphics chip's execution engine is limited to the static flow of the following: if a constant C1 is "0", vertex shader VS processes according to algorithm, instruction, or function I1', followed by algorithm I2' and followed by algorithm I3' before being output; and if a constant C1 is "1", vertex shader VS processes according to algorithm I4' and algorithm I5' before being output. In this regard, all of the graphics data must be processed in these static rules of process flow, i.e., some of the data cannot be processed according to different rules of process flow. More particularly, the graphics data cannot currently be processed according to dynamic branches of program P determined at runtime, e.g., an "If Then" or "If Then Else" command or structure based upon a runtime condition cannot be deployed in a program. Accordingly, it would be desirable to provide dynamic flow control for programs that are downloaded to a vertex shader VS, whereby a coprocessor can receive a program which thereby programs the coprocessor to dynamically process data in a particular way defined by the program, and wherein the coprocessor can process data differently according to different branches defined by the program. For instance, according to criteria specified in the program, it would be desirable to process some of the data streaming through the coprocessor according to a first algorithm depending upon a first condition that is set or discovered at runtime, and some of the data according to a second algorithm depending upon a second runtime condition or setting without recourse to downloading another program. It would be further desirable to enable branching to occur dynamically during the execution of a program that has been downloaded to a graphics chip to predicate control of the processing of graphics data on runtime characteristics or variables.

It is to be noted that the dichotomy of symbolic representation, e.g., I1 v. I1', is used above when describing a program instruction versus its functional representation as a part of a program that has been downloaded to a graphics chip, respectively; however, one can appreciate that a program may be parsed and/or partially, quasi- or fully tokenized or compiled en route to the graphics chip as part of the download process to format the program for reception and use by the graphics chip. As a consequence, the process of tracing or finding definitive correspondence between a representation I1' in the graphics chip and a source code instruction I1 may be amorphous. Moreover, where one instruction "ends" and another "begins" is not necessarily definitive, atomicity of operation may be defined in different ways, programs operate according to functional objectives, which can be divided into subsets of functional objectives, which can be divided into even smaller subsets of functional objectives, and so on. Thus, such symbolism for instructions has been used herein for conceptual or illustrative purposes.

FIGS. 2A and 2B collectively illustrate another point with respect to currently existing architectures that provide the ability to download a program, or algorithmic elements, to a programmable vertex shader in a graphics coprocessing subsystem. FIG. 2A illustrates a current architecture of a graphics API GAPI. FIG. 2A illustrates that graphics API GAPI, such as a 3D graphics API, generally includes many different interfaces for corresponding different reasons. For instance, as illustrated, graphics API GAPI includes program download object(s) or interface(s) DO for use in connection with (A) specifying program(s) to be downloaded to the vertex shader VS, e.g., by a developer or an executing software application A, (B) partially or wholly parsing and/or partially or wholly tokenizing and/or compiling the instructions of the specified program(s), taking into account whether or not the specified program(s) have already been parsed, tokenized, compiled, etc. (C) and transmitting the program(s) to the graphics coprocessing subsystem in a format for the vertex shader VS.

Graphics API GAPI also includes, however, many other objects and interfaces, such as external object(s) or interface(s) EO, which may be used in connection with, inter alia, initializing, setting or changing various storage elements, such as registers, located in the graphics coprocessing subsystem, e.g., in the vertex shader VS. Thus, as illustrated in FIG. 2B, an exemplary vertex shader VS includes at least (1) a storage bank for n constants C[0] to C[n−1], which are immutable (read only) during operation of the vertex shader VS, (2) a plurality of readable/writable input register storage elements I1 to Ik (e.g., for vertices, intermediate programming results, etc.) and (3) a plurality of readable/writable output register storage elements O1 to Om. Exemplary vertex shader VS may include other register storage elements for storing other kinds of variables and constants as well, whether readable and/or writable.

Because of how quickly the above described storage elements can be accessed by the execution engine EE of the vertex shader VS, a program loaded into vertex shader VS via download object(s) DO can also execute upon large quantities of data streamed through the execution engine EE very quickly. Constants C[0] to C[n−1] may be first set by the external objects EO in order to define the context into which program(s) are to be downloaded, and constants C[0] to C[n−1] can also be declared globally at the loading or instantiation of a program in the vertex shader VS for reference during operation of the program, although constants may not be altered or reset during operation of the program, e.g., while the execution engine EE processes a stream, or container, of graphics data. In this regard, as implied by the notation, C[0] to C[n−1], constants are capable of being referenced by index with programming commands. An exemplary command that indexes a constant is the command "mov $r_0$, C[3]," which when executed moves the value $r_0$ into constant storage location C[3]. However, presently, no readable and writable storage element in vertex shader VS may be referenced by index, i.e., a "mov $r_0$, I2" or a "mov $r_0$, O7" command can be executed, but the equivalent "mov $r_0$, I[1]" or "mov $r_0$, O[6]" commands using an index into the array of input and output registers can not be performed. The registers I1 to Ik and O1 to Om are individually and independently addressable only. Thus, a program cannot currently index readable/writable input and output registers of a vertex shader VS. This would be particularly desirable and provide more vertex shader flexibility for a variety of reasons, including, but not limited to, achieving looping or recursive behavior within a program downloaded to the vertex shader VS.

FIG. 3A illustrates an exemplary conventional texture mapping process wherein complex three dimensional (3-D) objects, or portions thereof, can be represented by collections of adjacent triangles ("a mesh") representing the approximate geometry of the 3-D object, or by a geometry map, or surface, in two dimensional (2-D) surface space. One or more texture maps can be mapped to the surface to create a textured surface according to a texture mapping process. In a conventional graphics system, the surface geometry sampling happens before texture sampling. In this regard, signals textured over a surface can be very general, and can specify any sort of intermediate result that can be input to a shader procedure to produce a final color associated with a point sample, and thus need not specify a function of color or grey scale values.

After texture sampling, additional transformations optionally can be applied to the textured surface prior to rendering the image with picture elements (pixels) of a display device. Images in computer graphics are represented as a 2-D array of discrete values (grey scale) or as three 2-D arrays of discrete values (color). Using a standard (x, y, z) rectangular coordinate system, a surface can be specified as a mesh (e.g., triangle mesh) with an (x, y, z) coordinate per mesh vertex, or as a geometry map in which the (x, y, z) coordinates are specified as a rectilinear image over a 2D (u, v) coordinate system, sometimes called the surface parameterization domain. Texture map(s) can also be specified with the (u, v) coordinate system.

Point samples in the surface parametrization domain, where signals have been attached to the surface, including its geometry, can be generated from textured meshes or geometry maps. These samples can be transformed and shaded using a variety of computations. At the end of this transformation and shading processing, a point sample includes (a) positional information, i.e., an image address indicating where in the image plane the point maps to and (b) textured color, or grey scale, information that indicates the color of the sample at the position indicated by the positional information. Other data, such as depth information of the point sample to allow hidden surface elimination, can also be included. The transformed, textured surface is placed in a frame buffer prior to being rendered by a display in 2-D pixel image space (x, y). At this point, in the case of a black and white display device, each (x, y) pixel location in 2-D image space is assigned a grey value in accordance with some function of the surface in the frame buffer. In the case of a typical color display device, each (x, y) pixel location in 2-D image space is assigned red, green and blue (RGB) values. It is noted that a variety of color formats other than RGB exist as well.

In order to render the surface on the display device itself, conventionally, the textured surface is sampled at positions that reflect the centers of the pixels of the device on which the image is to be displayed. This sampling may be performed by evaluating a function of the transformed, textured surface, at points that correspond to the center of each pixel, by mapping the centers of the pixels back into texture space to determine the point sample that corresponds to the pixel center.

Having described an exemplary texture mapping process, FIG. 3B illustrates that present graphics coprocessing subsystem architectures do not accommodate the storage and manipulation of texture maps in video memory by a vertex shader VS. Presently, vertex buffer VB, the video memory allocated for use with the vertex shader VS, can store whole sets of integers, which is suitable for processing of vertex, or positional information. Vertex buffer VB is thus well suited for storing positional information associated with vertices of a geometry map, but vertex buffer VB cannot presently store, or output, float data precise enough to represent a texture map meeting the requirements for today's graphics pipelines and output devices. Since vertex shader VS generally operates with respect to vertex data, i.e., positional information, sufficient precision to handle the colorization requirements of a texture map has generally not been a concern at the vertex shading stage. Thus, vertex buffer VB does not presently support float data inputs or outputs. However, there are a variety of operations and transformations that can be applied at the vertex shading stage for which float precision would be desirable. More particularly, 32 bit float precision would be desirable for supporting texture storage and processing by vertex shader VS, in keeping with the evolution of the graphics pipeline including the appearance of high precision monitors that have support for 10 bit rasterization, as opposed to a conventional 8 bit rasterization, processes.

It would be further desirable to increase the number of registers available on a vertex shader for use by a vertex shader during operation as input, output, intermediate and other special purpose storage. For instance, a program downloaded to the vertex shader could benefit from increased amount of register storage available on the vertex shader for more variables, temporary storage, outputs, etc. Presently, the number of register storage elements in a vertex shader VS is limited to 12.

It would be further desirable to increase the number of instructions that can be accommodated in a program to be downloaded to a vertex shader. Presently, the number of instructions that can be downloaded as a program to a vertex shader via the 3D graphics API is 96. One of ordinary skill can appreciate that the complexity of algorithms to be performed by the vertex shader VS is limited by this limit of instructions. Thus, it would be desirable to raise the bar from the current maximum number of instructions that can be packaged for execution by a vertex shader VS.

With respect to the processing of multiple vertex streams simultaneously, prior art vertex shaders are invoked once per vertex, i.e., with every invocation of the vertex shader, the input registers are initialized with unique vertex elements from the incoming vertex streams. Thus, as illustrated in FIG. 4, with older shader models, a vertex data point is input from each of vertex data streams VDS1 and VDS2 to load the input registers I1 to Ik for each "cycle" of the vertex shader VS. While the processing of multiple vertex data streams, or containers, simultaneously in parallel is advantageous in its own right, not all algorithms are well suited to processing parallel data streams by processing a data point from each data stream upon each operational cycle of the vertex shader VS. For instance, at the cycle designated by start time t1, vertex data point V1 and W1 are input to the appropriate input registers of vertex shader VS for processing and corresponding output. At the start of the next cycle, at time t2, vertex data point V2 and W2 are input to the appropriate input registers of vertex shader VS for processing and corresponding output, and so on. However, currently, a program downloaded to vertex shader VS can not process two vertex data points from vertex data stream VDS1, then process one vertex data point from vertex data stream VDS2, then two from VDS1, then one from VDS2, and so on, repetitively. Thus, it would be desirable to provide support for division of inputs from multiply specified data streams for processing by the vertex shader VS. More particularly, when multiple data streams are input to a vertex shader VS, it would be desirable to specify frequencies for each data stream input which determine how often data from each respective stream is input to the vertex shader. VS.

On the pixel shader side of the graphics pipeline, there are also several ways in which improvement may be achieved. Similar to vertex shaders, for instance, a program can be downloaded to current pixel shaders via a graphics API for execution by the pixel shader generally for specialized operations on pixels. In this regard, the number of local registers provided for use with the pixel shader and the maximum number of instructions that may be provided for a program downloaded to the pixel shader currently limit the complexity and sophistication of operation that can be achieved with a downloaded program. The number of local registers currently available for use in connection with operation of a pixel shader is 6-12 and the maximum number of instructions that a program may include if it is to be downloaded to a pixel shader is 256. Thus, it would be desirable to increase the number of local registers provided on a pixel shader. It would also be desirable to increase the maximum number of instructions that may be associated with a program to be downloaded to a pixel shader.

FIG. 5A illustrates an exemplary conventional configuration of a graphics API with respect to a vertex shader VS, a setup engine SE and a pixel shader PS. Setup engine SE conventionally is used to, as the name implies, setup data for processing by the pixel shader PS in some fashion. For instance, the data from vertex shader VS may be clipped, or formatted for pixel processing, or the span may be setup. Currently, however, there is no way to specify to the pixel engine of pixel shader PS that an incoming pixel data point is a frontward facing pixel or a backward facing pixel, e.g., to achieve different effects for the front face of a triangle as opposed to the back face of a triangle. As a result, as conceptually illustrated in FIG. 5B, pixels p1, p2, p3 appear exactly the same for the front of triangle T as they do for the back of triangle T. Thus, it would be desirable to include the ability to specify whether a pixel is frontward facing or backward facing for use in connection with a pixel shader PS. It would be further desirable to provide a register on the pixel shader PS for storage of such "face" information during pixel processing.

Additionally, the pixel shader side of the graphics pipeline is even more limited than the vertex shader side with respect to branching, i.e., flow control, in programs. While programs, i.e., algorithmic element(s) packaged as tokenized set(s) of instructions, currently can be downloaded to a pixel shader, the flow represented by a program performed by the pixel shader PS must be static, non-branched and not predicated upon characteristics that become known at runtime. Thus, for instance, as illustrated in FIG. 6A, a developer D (or a software application A) can specify a program P having exemplary instructions I1 to I5 to a graphics API GAPI for download to the graphics chip, such as pixel shader PS, in order to program the graphics chip to perform the algorithms represented by the program P. Once the program P is downloaded to pixel shader PS, i.e., once pixel shader PS is programmed with program P, graphics data processed by pixel shader PS must be processed according to the algorithms I1' to I5' represented by or corresponding to instructions I1 to I5. However, presently, there can be no branching taking place, whether based upon a characteristic or variable set or generated during operation of the runtime system or not.

While the ability to define a static non-branched process flow for all graphics data to be processed according to algorithms I1' to I5' on the pixel shader is beneficial, branching behavior is an important and powerful programming tool and thus it would be desirable to provide both static branching behavior based upon pre-set characteristics of the system, as well as dynamic branching behavior based upon runtime characteristics, for programs downloaded to pixel shaders.

As illustrated in FIG. 6B, represented by the arrows illustrating the computational flow process performed on the graphics data, the processing that occurs for each data point of the graphics data streamed through the pixel shader's execution engine is limited to being processed according to algorithm (or function) I1', followed by being processed according to algorithm I2', followed by being processed according to algorithm I3', followed by being processed according to algorithm (or function) I4', and lastly by being processed according to algorithm I5' before being output. In this regard, all of the graphics data must be processed in this exact static sequence, i.e., some of the data cannot be processed according to a different sequence or branch. More particularly, the graphics data cannot currently be processed according to different branches of program P, e.g., an "If Then" or "If Then Else" command or structure cannot be deployed, and no different branches can be staticly defined prior to downloading the program either.

Accordingly, it would be desirable to provide both static and dynamic flow control for programs that are downloaded to a pixel shader, whereby a coprocessor can receive a program which thereby programs the coprocessor to process data according to branches and conditions defined by the program, and wherein the coprocessor can process data differently according to the different branches defined by the program. For instance, according to criteria specified in the program, it would be desirable to process some of the data streaming through the coprocessor according to a first algorithm dependent upon the presence of a pre-set constant, or variable set or generated at runtime, and some of the data according to a second algorithm without recourse to downloading another program. In short, it would be desirable to enable branching to occur during the execution of a program once downloaded to the pixel shader to predicate control of the processing of graphics data on preset or runtime characteristics or variables.

SUMMARY OF THE INVENTION

In view of the foregoing, the present invention provides systems and methods for downloading algorithmic elements to a coprocessor and corresponding processing and communication techniques. For an improved graphics pipeline, the invention provides a class of co-processing device, such as a graphics processor unit (GPU), providing improved capabilities for an abstract or virtual machine for performing graphics calculations and rendering. The invention allows for runtime-predicated flow control of programs downloaded to coprocessors, allowing significantly more sophisticated effects and algorithms to be implemented. The invention enables coprocessors to include indexable arrays of on-chip storage elements that are readable and writable during execution of programs. By providing for float storage in vertex buffer storage associated with a vertex shader, the invention provides native support for textures and texture maps and corresponding operations. The invention further provides frequency division of vertex streams, so that multiple vertex data streams may be input to a vertex shader in parallel, but the respective data of the respective data streams need not be consumed by the execution engine of the vertex shader VS at the same frequency, or rate. Each stream may have an associated stream modulo value too. For pixel shaders, the invention provides a register storage element on a pixel shader and associated interfaces for storage associated with representing the "face" of a pixel, i.e., whether it is a frontward facing pixel or a backward facing pixel. The invention further provides vertex shaders and pixel shaders with more on-chip register storage and the ability to receive larger programs than any existing vertex or pixel shaders, providing increased programming flexibility. The invention still further provides 32 bit float number support in both vertex and pixel shaders.

Other features of the present invention are described below.

BRIEF DESCRIPTION OF THE DRAWINGS

The system and methods for downloading algorithmic elements to a coprocessor and corresponding processing and communication techniques are further described with reference to the accompanying drawings in which:

FIGS. 1A and 1B illustrate a static branching characteristic of prior art vertex shaders;

FIGS. 2A and 2B illustrate limited indexing characteristics of prior art vertex shaders;

FIGS. 3A and 3B illustrate a state of prior art texture mapping processes;

FIG. 4 illustrates prior art parallel processing of vertex streams by a vertex shader;

FIGS. 5A and 5B illustrate prior art processing of pixels with a pixel shader;

FIGS. 6A and 6B illustrate prior art branching behavior of programs executed by pixel shaders;

FIG. 10A illustrates the handling of vertex stream frequency dividers for vertex shaders in accordance with the present invention;

FIG. 10B illustrates an exemplary geometry instancing process, which can be more flexibly achieved with the vertex stream frequency dividers for vertex shaders in accordance with the present invention;

FIGS. 14A to 19B illustrate exemplary ways in which similar interface code can be provided for achieving common objective(s) of the interface(s) for downloading programs to a coprocessor in accordance with the invention.

DETAILED DESCRIPTION OF ILLUSTRATIVE EMBODIMENTS

Overview

As mentioned in the background, current 3D graphics chips on the market can be made more flexible and efficient, with respect to both vertex shaders and pixel shaders.

For programs downloaded to vertex shaders, the invention enables branching to occur dynamically during the execution of the programs predicating control of the processing of graphics data characteristics or variables that are set or generated at runtime. The invention further enables programs downloaded to a vertex shader to index readable/writable input and output registers of the vertex shader, which in turn enables looping or recursive behavior to be specified in programs. The invention further provides vertex buffers associated with vertex shaders with support for float data inputs or outputs, including 32 bit float precision and storage support for texture maps in the vertex buffer. The invention still further provides 96 registers for vertex shaders and a max instruction count of 512 for a program downloaded to a vertex shader, representing increased flexibility over more constrictive prior art systems. The invention still further provides for controlled division of inputs from multiply specified data streams for processing by a vertex shader by enabling the specification of frequencies for each data stream input that determine how often data from each respective stream is input to the vertex shader.

For pixel shaders, the invention provides 6-12 temporary registers for pixel shaders and a max instruction count of 512 for a program downloaded to a pixel shader, representing increased flexibility over more constrictive prior art systems. The invention also provides a register storage element on a pixel shader and corresponding interfaces for specifying to the execution engine of the pixel shader that an incoming pixel data point is a frontward facing pixel or a backward facing pixel, e.g., to achieve different effects for the front face of a triangle as opposed to the back face of a triangle. The invention also enables static and dynamic flow control for programs that are downloaded to a pixel shader, whereby a coprocessor can receive a program which thereby programs the coprocessor to process data according to branches and conditions defined by the program, and wherein the coprocessor can process data differently according to the different branches defined by the program. For instance, according to criteria specified in the program, the invention enables some of the data streaming through the pixel shader to be processed according to a first algorithm dependent upon the presence of a pre-set constant, or variable set or generated at runtime, and some of the data according to a second algorithm without recourse to downloading another program.

Systems and Methods for Downloading Algorithmic Elements to a Coprocessor

I. Vertex Shaders

Figure 7A:
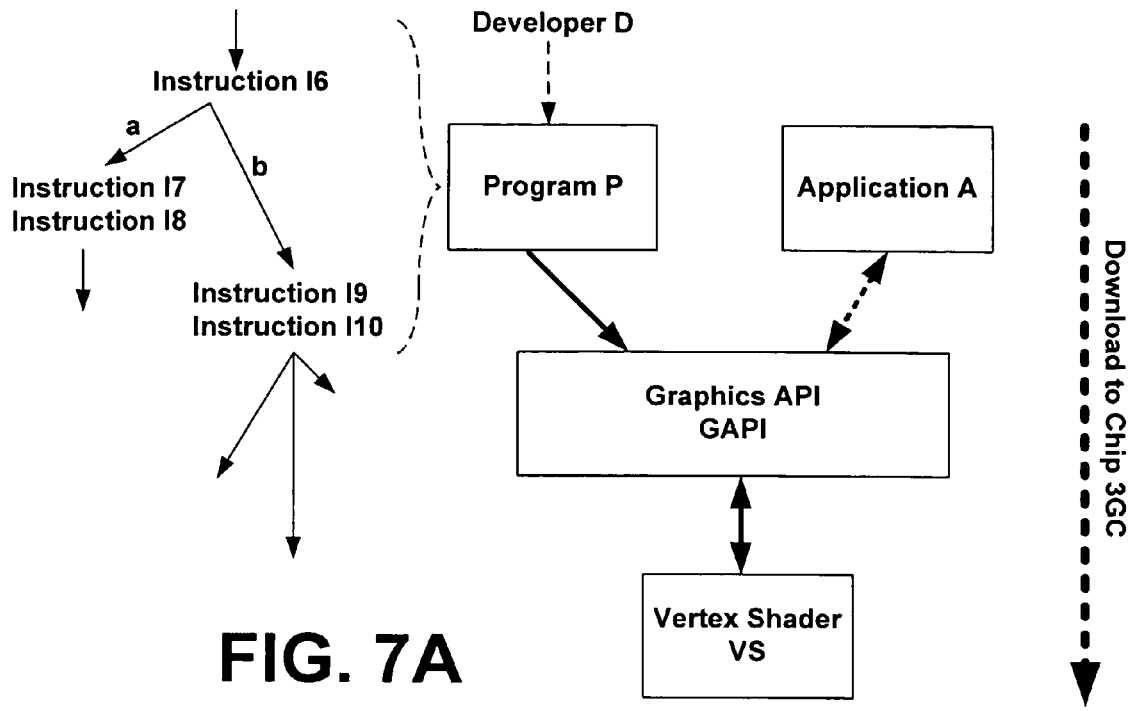
FIGS. 7A and 7B illustrate dynamic branching behavior associated with vertex shaders in accordance with the present invention.
Figure 7B:
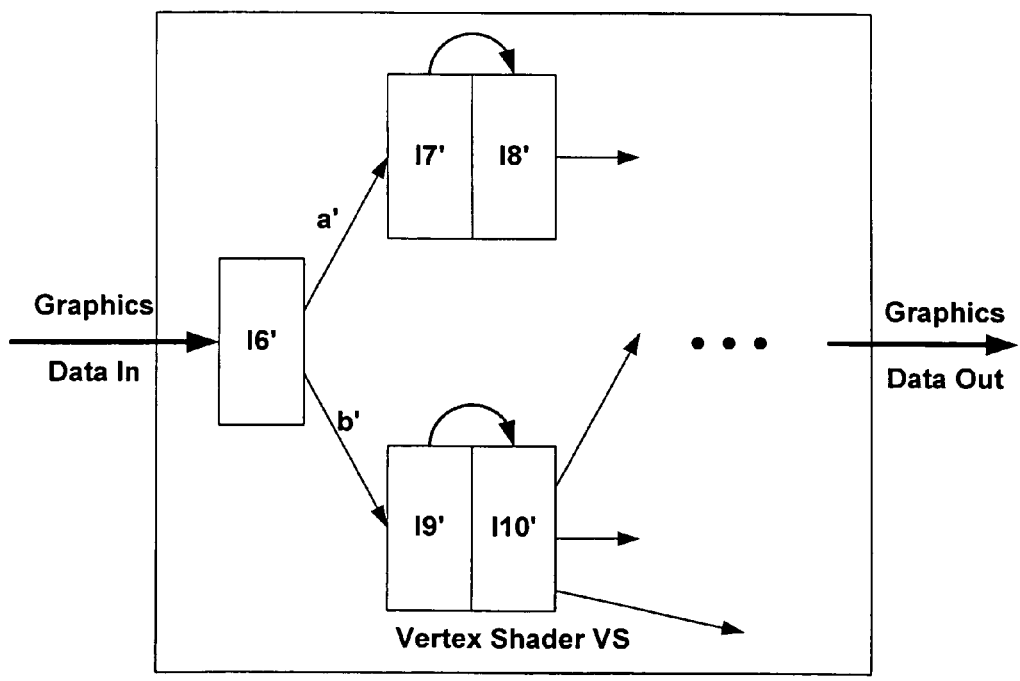

As mentioned in the background, existing vertex shaders do not support runtime predicated dynamic flow control of programs. Thus, as illustrated in FIGS. 7A and 7B, the invention enables a program to be defined with branches according to variables or context, e.g., conditions a or b, that will be known at runtime. In the exemplary program P depicted in FIG. 7A, after instruction I6, the program specifies that if runtime behavior a is present, instruction I7 will be processed next, followed by instruction I8, and so on. After instruction I6, the program specifies that if runtime behavior b is present instead, instruction I9 will be processed next, followed by instruction I10, etc. The representational flow of this branching behavior of program P loaded into vertex shader VS is depicted in FIG. 7B. The graphics data is processed according to either runtime behavior a' (corresponding to condition a in program P) or behavior b' (corresponding to condition b in program P), and a programmer, looking ahead to the runtime environment, can dynamically control the flow or branching behavior associated with a program P for processing graphics data input to vertex shader VS. Providing more flexibility in program definition, the invention thus enables each graphics data point input to vertex shader VS to be processed uniquely according to the dynamic flow.

Exemplary non-limiting syntax for achieving existing static flow and dynamic flow in accordance with the invention for vertex shaders is as follows:

For static flow control, the following exemplary instructions (and corresponding exemplary non-limiting restrictions) may be used:

IF—Start of a constant IF-block

The src param (BOOL register) accepts a NOT modifier. IF can be nested up to 24 times (24 deep).

ELSE—Start of the ELSE block

ENDIF—Marks the end of an IF-block (or IFC-block)

CALL—call a subroutine

Calls can be nested 4 times (4 deep). CALLNZ (predicated and the non-predicated varieties) count to this limit.

CALLNZ—call a subroutine

Calls can be nested 4 deep. CALLNZ (predicated) and CALL count to this limit. The BOOL register accepts only the NOT modifier.

RET—return from a subroutine or main function

LOOP—start of a loop block

Loops can be nested 4 deep (counting rep-endrep).

ENDLOOP—end of a loop block

REP—start of a repeat block

Rep-loops can be nested 4 deep (counting loop-endloop).

ENDREP—end of a repeat loop block

For dynamic flow control, the following exemplary instructions (and corresponding exemplary non-limiting restrictions) may be used:

IFC—Start of the Conditional if-block

Instruction:

IFC (Comparison) SRC0, SRC1

Format:

OpCode with comparison token D3DSIO_IFC

Source token 0

Source token 1

Operation:

if (!(SRC0 comparison SRC1))

jump to the corresponding ELSE or ENDIF instruction;

The IFC instruction is used to skip a block of code, based on a condition. IFC block must end with ELSE or ENDIF instruction. IFC takes 2 slots. ifc-else-endifs (along with the predicated if blocks) can be nested up to 24 times (24 deep). SRC0 and SRC1 utilize a replicate swizzle. IFC-blocks do not straddle a loop block; an IFC-block should be either completely inside the loop block or surrounding the loop block.

IF—Start of the predicated if-block

Instruction:

if PredicateRegister.ReplicateSwizzle

Format:

Op code token D3DSIO_IF

Source token with D3DSPR_PREDICATE register type with a replicate swizzle. A NOT modifier is allowed.

The IF instruction is used to skip a block of code, based on a channel of the predicate register. An IF block ends with an ELSE or ENDIF instruction. IF-blocks can be nested. This counts to the total dynamic nesting depth along with IFC-blocks. An IF-block does not straddle a loop block, i.e., an IF-block should be either completely inside a loop block or surrounding the loop block. Not modifiers are allowed on the predicate channel.

BREAKP—Break conditionally out of a REP-ENDREP or LOOP-ENDLOOP on a predicate

Instruction:

BREAKP [!]SRC0

Format:

OpCode token with D3DSIO_BREAKC

Source token with D3DSPR_PREDICATE register type with a replicate swizzle. A NOT modifier is allowed.

Operation:

When the condition is true, it breaks out of the current loop at the nearest ENDLOOP or ENDREP.

The BREAKP opcode takes 2 instruction slots. A NOT modifier is allowed.

BREAKC—Break conditionally out of a REP-ENDREP or LOOP-ENDLOOP

Instruction:

BREAKC (comparison) SRC0, SRC1

Format:

OpCode with comparison token D3DSIO_BREAKC

Source token 0

Source Token 1

Operation:

When the comparison is true, it breaks out of the current loop at the nearest ENDLOOP or ENDREP.

Description:

The BREAKC opcode takes 2 instruction slots.

BREAK—Break out of a REP-ENDREP or LOOP-ENDLOOP

Instruction:

BREAK

Format:

OpCode token D3DSIO_BREAK

Operation:

It breaks out of the current loop at the nearest ENDLOOP or ENDREP.

The BREAK opcode takes 1 instruction slot.

CALLNZ—call a subroutine on a predicate

Instruction:

callnz label, [!]PredicateRegister.ReplicateSwizzle

Format:
Op code token D3DSIO_CALLNZ
Source token 1 (Label) Source token 2 (Predicate with replicate swizzle)

The CALLNZ instruction performs a conditional call based on the predicate channel. A NOT modifier can be applied. The instruction consumes one instruction slot. CALLNZ Calls can be nested 4 deep. This counts to the total CALL/CALLNZ depth. The predicate register accepts the NOT modifier.

Figure 8A:
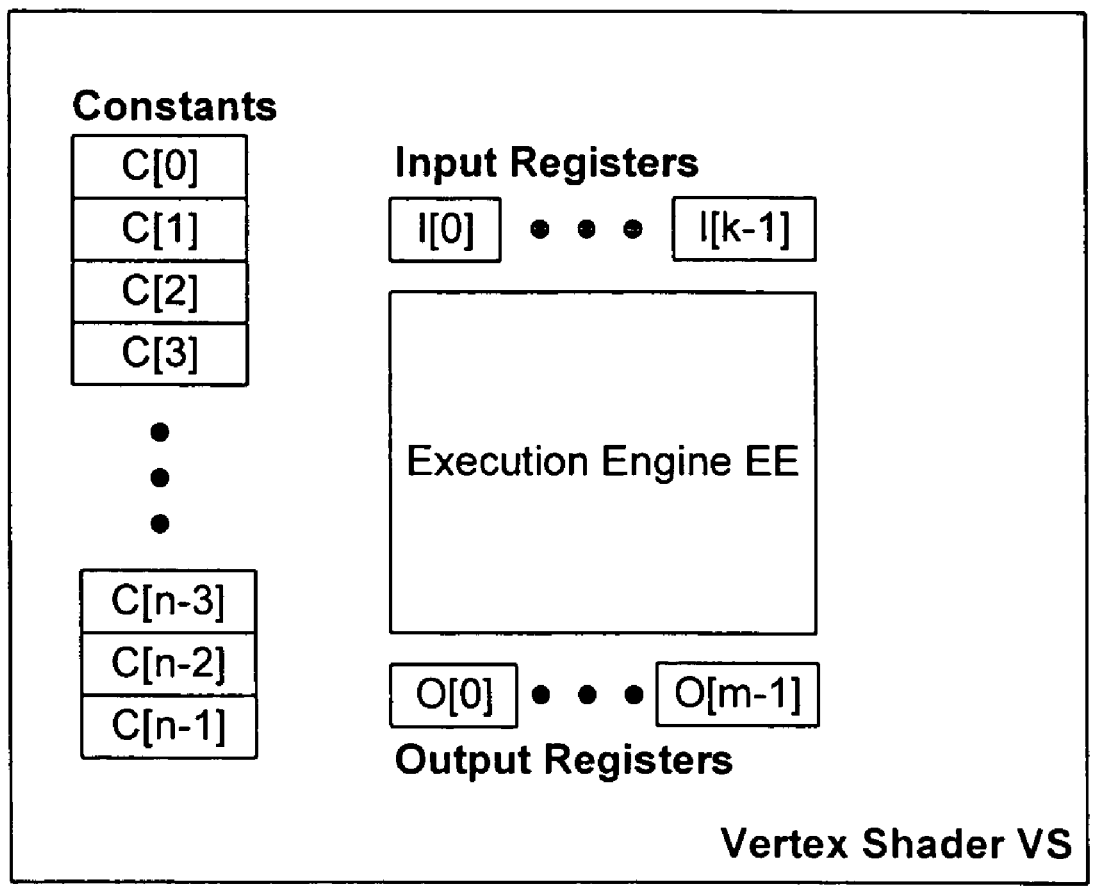
FIGS. 8A to 8C illustrate indexing capabilities of programs downloaded to vertex shaders in accordance with the present invention.
Figure 8B:
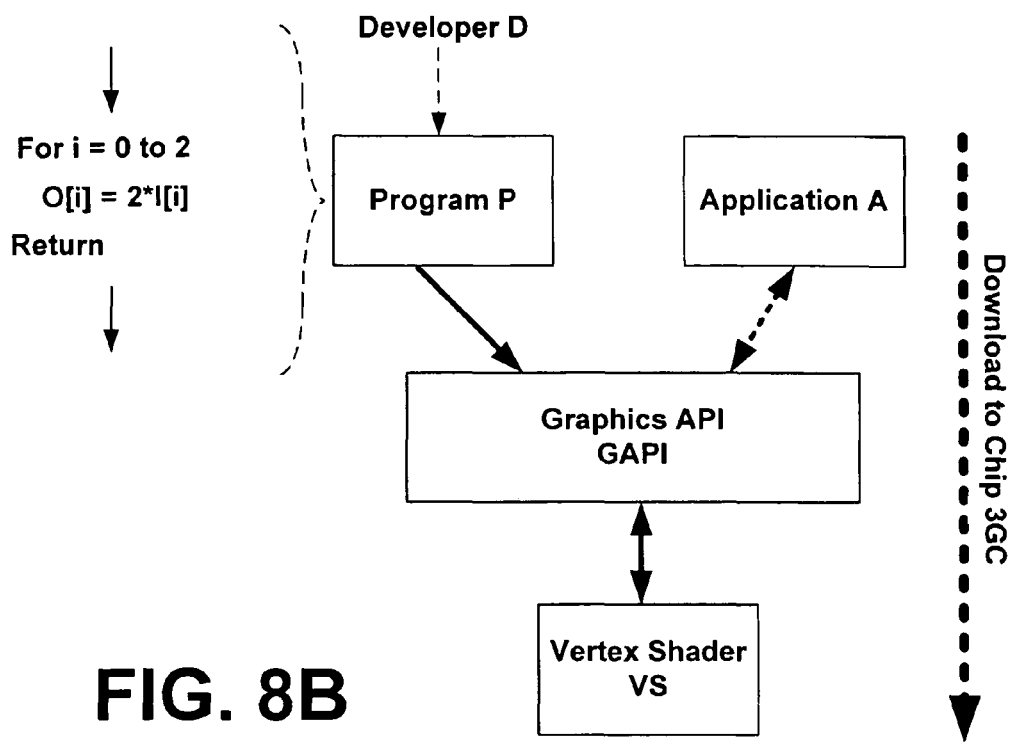
Figure 8C:
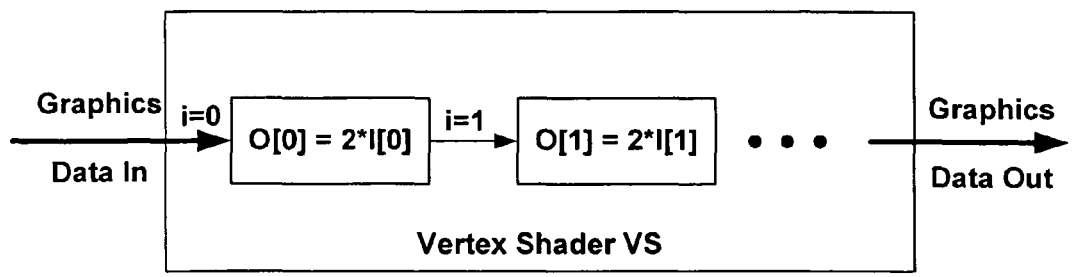

As mentioned with respect to FIGS. 2A and 2B, vertex shaders VS also lack readable and writable register storage that is indexable by commands of a program downloaded to vertex shader VS. As illustrated in FIG. 8A, vertex shader VS of the invention includes indexable input registers I[0] to I[k−1] and output registers O[0] to O[m−1]. Thus, as illustrated in FIG. 8B, a developer can write a program P that specifies operations for an entire bank of register storage by index. Previously, a separate instruction would be required for each register to be affected by the indexed command, whereas the indexing enables an operation to be performed across an array of (non-constant) storage elements. Thus, for the exemplary program P shown, three operations are performed wherein an index value i increments from 0 to 2, simultaneously expressing multiple operations to be performed with the simple indexed command: O[i]=2*I[i].

As mentioned, with earlier shader models, only the constant register bank could be indexed. In one non-limiting embodiment, the shader model of the invention additionally enables the following register banks to be indexed using a loop counter register (aL): Input registers (I[k]) and Output registers (O[m]). Since O[k] registers can be declared to have various semantics, care is taken indexing them. If indexing of output registers is present in the shader, for instance, the position0 and psize0 semantics are declared in O[0] and O[1], respectively. Thus, it may be undefined to index through O[i] registers that have been declared to have semantics: position and/or psize.

As implied, output declarations are introduced, whereby semantics are assigned to each register. Old oPos and oPts are replaced by declaring an o register with a position or pointsize semantic, further described below.

In one embodiment, there are 12 "out" registers. 10 of them (any 10, not necessarily o[0]-o[9]) have 4-components (x, y, z, w), another one is declared as position (all 4 components), and optionally one more can be a scalar pointsize.

In one non-limiting embodiment, the syntax for declaring outputs (O# registers) is similar to declarations for the inputs, as follows:
dcl_SomeSemantic o[.write_mask]
_SomeSemantic:

A similar set of semantics as for the input declaration can be used. Semantic names come from the enum D3DDECLUSAGE (and are paired with an index, e.g., position3). As mentioned, there is one O# register with _position0 declaration when not used for processing vertices. The position0 semantic and the pointsize0 semantic are have meaning to the graphics API GAPI, beyond simply enabling linkage from vertex to pixel shaders. For instance, for shaders with flow control, it is assumed that the worst case output is declared (dcl'd) because there are no defaults if a shader does not actually output what it declares it should due to flow control.
write_mask:

The same "out" register may be dcl'd multiple times so that different semantics can be applied to individual components, each time with a unique write mask. However, the same semantic may not be used multiple times in a declaration. Thus, vectors are 4 components or less, and do not transcend 4-component register boundaries (individual "out" registers). When the _pointsize semantic is used, it includes full write mask since it is considered a scalar. When the _position semantic is used, it includes full write mask since all 4 components are written.

Exemplary use scenarios for the above-described are as follows:

| | |
|---|---|
| vs_3_0 dcl_color4 o3.xyz | // color4 is a semantic name |
| dcl_texcoord3 o2.xyz | // different semantics can be |
| dcl_fog o2.w | |
| | // packed into one register. |
| dcl_tangent o4.xyz | // position is declared |
| dcl_position o7.xyzw | |
| | // to some unique register in a |
| | // vertex shader, |
| | // with all 4 components. |
| | // (when ProcessVertices is not used) |
| dcl_psize o6 | // Pointsize does not have a mask |
| | // (i.e., mask is full - xyzw) −> |
| | // this is an implied scalar |
| | // register. |
| | // No other semantics are |
| | // assigned to any components |
| | // of this register. |
| | // If pointsize declaration is |
| | // NOT used (typical), then |
| | // only 11 "out" registers are |
| | // available, not 12. |
| | // Pixel shaders do not see this |
| | // value. |

Since dynamic branching can take place, as described above, there is a potential for varying outputs per vertex. The output of the shader can also vary with static flow control.

Figure 9:
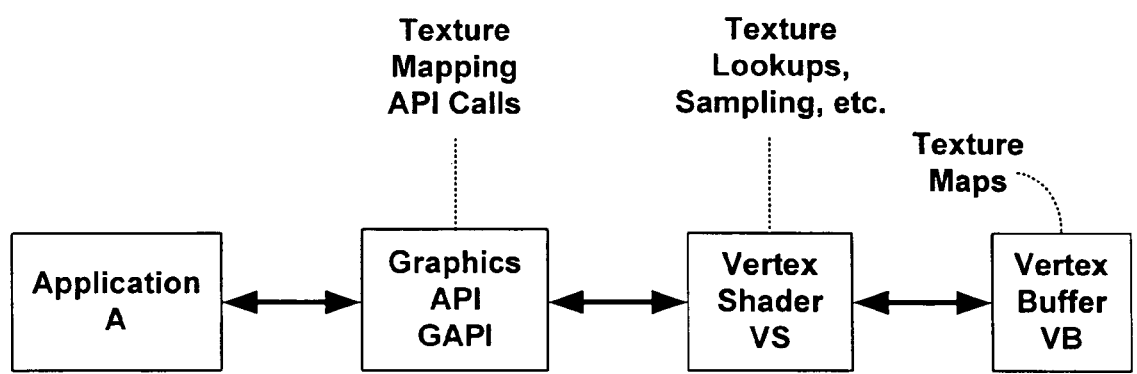
FIG. 9 illustrates support for texture look ups by vertex shaders in accordance with the present invention.

FIG. 9 illustrates vertex shaders VS in accordance with the invention that include support for texture mapping operations to be defined by function calls from graphics API GAPI, and support for storage of texture maps in vertex buffer storage. The invention supports texture lookup in vertex shader VS via the TEXLDL instruction. 4 separate texture samplers stages (distinct from the displacement map sampler and the texture samplers in the pixel engine) exist in the vertex engine that can be used to sample textures set at those stages. The stages themselves can be programmed with a SetSamplerState( ) API, and the vertex stages are numbered from D3DVERTEXTURESAMPLER to D3DVERTEXTURESAMPLER+3. Textures can be set at those stages using the SetTexture( ) API, with the stage index running from D3DVERTEXTURESAMPLER to D3DVERTEXTURESAMPLER+3.

With the increased precision of float representation of textures for look up by a vertex shader VS, the invention enables displacement maps to be applied to data. Displacement maps represent perturbations in positional information with a high degree of precision. While a texture map can create a rough appearance of a surface, the geometry itself may appear undesirably smooth at the edges. Accordingly, a displacement map can perturb the geometry itself to create a more realistic "rough" effect. Previously, vertex shaders did not include storage support for the float precision required of a displacement map, and thus displacement maps are an example of the kind of increased flexibility that the graphics API of the present invention provides developers.

Also, a new register has been introduced in vertex shader VS—the sampler register that represents the vertex texture sampler. This register is defined in the shader before using it via graphics API GAPI. An application can query if a format is supported as a vertex texture by calling CheckDeviceFormat( ) with the D3DUSAGE_QUERY_VERTEXTEXTURE flag. A vertex texture created in POOL_DEFAULT can be set as a pixel texture and vice versa. In one embodiment, to use the software vertex processing, the vertex texture is created in the POOL_SCRATCH (regardless of whether it is a mixed mode device or a software vertex processing device).

In one non-limiting embodiment, the functionality is similar to the functionality of pixel textures except for the following: (A) Anisotropic texture filtering is not supported. Hence D3DSAMP_MAXANISOTROPY is ignored and D3DTEXF_ANISOTROPIC cannot be set for neither MAGFILTER nor MINFILTER for these stages and (B) Rate of change information is not available, and hence the application computes the level of detail (LOD) and provides that information as a parameter to the TEXLDL instruction.

In various non-limiting alternate embodiments, similar to pixel textures, if MET textures are supported for vertex textures, D3DSAMP_ELEMENTINDEX is used to figure out from which element to sample. The state D3DSAMP_DMAPOFFSET is ignored for these stages. Not all texture formats may be supported as vertex textures. Formats that support D3DUSAGE_QUERY_VERTEXTEXTURE can be used as vertex textures. The application can query whether support exists for a particular texture format with the CheckDeviceFormat( ) API.

In various other non-limiting alternate embodiments, a caps field D3DCAPS9.VertexTextureFilterCaps indicates what kinds of filters are legal at the vertex texture samplers. D3DPTFILTERCAPS_MINFANISOTROPIC and D3DPTFILTERCAPS_MAGFANISOTROPIC are disallowed. Applications should also query if a format is supported as cube/volume at a vertex texture sampler. Also, there are no wrap modes for vertex texture coordinates since there is no connectivity information available inside a vertex shader.

A sampling stage register S# identifies a sampling unit that can be used in texture load statements. A sampling unit corresponds to the texture sampling stage, encapsulating the sampling-specific state provided in the SetSamplerState( ) API. In one embodiment, there are 4 vertex samplers.

Each sampler uniquely identifies a single texture surface which is set to the corresponding sampler using the IDirect3DDevice9::SetTexture(I, lpTexture) method. However, the same texture surface can be set at multiple samplers.

At draw time, a texture is not simultaneously set as a RenderTarget and a texture at a stage. In the embodiment wherein there are 4 samplers supported, up to 4 texture surfaces may be read from in a single shader pass. A sampler register may appear as an argument in the texture load statement: TEXLDL. In a preferred non-limiting embodiment of the invention, if a sampler is used, it is declared at the beginning of the shader program using a DCL statement.

The ability to perform texture look ups with vertex shaders VS in accordance with the invention also supports software transformation and lighting (T&L). The software T&L filter types supported can be checked by looking at the D3DCAPS9.VertexTextureFilterCaps field in the caps structure obtained by a call to the IDirect3DDevice9::GetDeviceCaps( ) API in the software mode. Published texture formats are supported as vertex textures in software vertex processing.

An application can check if a particular texture format is supported in the software vertex processing mode by calling CheckDeviceFormat( ) and providing (D3DUSAGE_QUERY_VERTEXTEXTURE|D3DUSAGE_SOFTWAREPROCESSING) as usage. All formats are supported for software vertex processing. POOL_SCRATCH may be used for software vertex processing.

Exemplary non-limiting API calls and syntax for achieving the above-described texture operations with vertex shaders VS include:

```
// New Define
#define D3DVERTEXTEXTURESAMPLER (D3DDMAPSAMPLER+1)
// New usage
#define D3DUSAGE_QUERY_VERTEXTEXTURE (0x00100000L)
// New caps field in D3DCAPS9
DWORD VertexTextureFilterCaps;
```

Also, in addition to the changes to the device driver interface (DDI) described below, a new D3DFORMAT_OP_ has been added to DDI such that the drivers use to mark formats that the vertex texture sampler understands. These formats are then allowed to be used as vertex textures (e.g., an application calls CheckDeviceFormat( ) with the usage flag D3DUSAGE_QUERY_VERTEXTEXTURE). In a non-limiting embodiment, the usage flag is defined as follows:
define    D3DFORMAT_OP_VERTEXTEXTURE
   0x00400000L With respect to output registers, in one embodiment, the various types of output registers are collapsed into 12 output registers O# (2 for color, 8 for texture, 1 for position, and 1 for fog and pointsize). These can be used for anything the user wishes to interpolate for the pixel shader: texture coordinates, colors, fog, etc.

As mentioned, the invention improves upon the number of instruction slots that may be occupied by a program P for download to a vertex shader. In this regard, devices that support the invention support at least 512 instruction slots. The maximum count of slots that is supported is indicated by the cap D3DCAPS9.MaxVertexShader30InstructionSlots. The maximum value that can be set on this cap is 32768. The number of instructions executed can be higher because of the looping support. The 3DCAPS9.MaxVShaderInstructionsExecuted cap applies as well and should be at least 2^16. The total number of instructions executed can be clamped to the DDI-only render state D3DRS_MAXVERTEXSHADERINST. The legal values for this render state are numbers that are powers of 2; if any other integer is set, the next nearest power of 2 number is assumed. In one embodiment, this defaults to D3DINFINITEINSTRUCTIONS.

Table I below illustrates an exemplary non-limiting implementation of registers for a vertex shader in accordance with the class of virtual machine defined by the invention.

TABLE I

Exemplary Non-Limiting Registers and Corresponding Characteristics

| Register Type | Count | r/w | #read-ports | #reads/inst | Dimension | RelAddr | Defaults | Requires DCL |
|---|---|---|---|---|---|---|---|---|
| Input(v#) | 16 | r | 1 | unlimited | 4 | aL only | partial(0001) | y |
| Temp (r#) | 32 | r/w | 3 | unlimited | 4 | n | none | n |

TABLE I-continued

Exemplary Non-Limiting Registers and Corresponding Characteristics

| Register Type | Count | r/w | #read-ports | #reads/inst | Dimension | RelAddr | Defaults | Requires DCL |
|---|---|---|---|---|---|---|---|---|
| Float Constant (c#) | 256(at least) | r | 1 | unlimited | 4 | y | 0000 | n |
| Integer Constant (i#) | 16 | r | 1 | 1 | 4 | n | 0000 | n |
| Bool Constant (b#) | 16 | r | 1 | 1 | 1 | n | FALSE | n |
| Address (a#) | 1 | u/w | n/a | unlimited | 4 | n/a | none | n |
| Loop Counter (aL) | 1 | u | n/a | unlimited | 1 | n/a | none | n |
| Sampler (s#) | 4 | r | 1 | 1 | 1 | n | none | y |
| Output (o) | 12 | w | n/a | n/a | 4 | aL only | None | y |

Table I below illustrates an exemplary non-limiting implementation of registers for a vertex shader in accordance with the class of virtual machine defined by the invention.

In Table I, "r" corresponds to Read, "w" corresponds to Write and "u" corresponds to Use. For a partial (x, y, z, w), if only a subset of channels are updated in the register, in one embodiment, the remaining channels default to specified values (x, y, z, w). aL only register banks can be addressed using the aL register. In Table I, "r" corresponds to Read, "w" corresponds to Write and "u" corresponds to Use. For a partial (x, y, z, w), if only a subset of channels are updated in the register, in one embodiment, the remaining channels default to specified values (x, y, z, w). aL only register banks can be addressed using the aL register.

With respect to exemplary register defaults for a vertex shader, use of uninitialized temporary, address registers may be made illegal, the result being undefined. A runtime debug component may attempt to detect such usage (if there is no dynamic flow control) and return a failure at Draw( ) time. Other defaults are specified in the table above.

With respect to modifiers for a vertex shader, the following modifiers are supported:
– (negate): Source modifier—Negation operator.
_abs: Source modifier—Absolute value of the source.
swizzle: Source modifier—Full swizzles are supported.
_sat: Instruction modifier—Clamps from 0 to 1.
_abs and negate (–) or both (–r0.abs) are supported on reads. If both are present, the abs( ) happens first.

Other instructions supported by a vertex shader in accordance with the invention include:
DCL—Sampler Declaration Statement
Instruction:
dcl_textureType s#
Description:
Declare sampler s# w/attribute: texture address dimension.
Operation:
_textureType (i.e. _2d, _cube, _volume) defines how many dimensions texture coordinates have in order to perform a texture lookup with the given sampler.
It is noted that the declaration for samplers does not include a writemask. In other words, sampling a texture writes out 4 components. An example follows:

```
dcl_cube s3;        // indicates that sampler 3 will look up
                    // a cube map
.
.
.
texldl r0, r3, s3;  // Also, r3 is expected to have .rgb
                    // initialized, since s3 is declared as a
                    // cube map.
                    // All 4 components of r0 are written
                    // with texture lookup result (including
                    // defaults for components missing in
                    // texture format).
```

In one embodiment, the DCL instruction occupies 0 instruction slots, appears before the first arithmetic or addressing instruction in the shader program P and can be intermixed with def instructions (which are the other type of instruction that resides at the beginning of a shader). dst is s# for this type of dcl and a given s# register can only be dcl'd once. The component mask is not specified (same as full mask) and _textureType is one of: _2d, _cube and _volume.
TEXLDL—Texture lookup with a provided LOD (see description herein relating to texture look ups in vertex shader)
ABS—absolute value
ADD—add two float vector operands
CRS—cross product macro
DCL—Declaration of the vertex input and output registers
The syntax for DCL allows for a write mask. Exemplary syntax for the output registers is as follows:
dcl_position2, v0.xz
dcl_diffuse, v0.y
//Decl for the output
dcl_position2, o0.xz
dcl_diffuse, o1.y
Further, input vertex element data is copied to the specified components if a corresponding stream declaration is found. The un-declared components are not set to default values. Components that are specified in the input declaration are referenced in the vertex shader. If a component is declared but is not provided via the vertex declaration, then it assumes the usual default value (x, y, z default to 0 and w to 1). Thus, for the following exemplary input vertex declaration:
0,          0,          D3DDECLTYPE_FLOAT2, D3DDECLUSAGE_DIFFUSE, 0
0,          8,          D3DDECLTYPE_FLOAT3, D3DDECLUSAGE_POSITION, 2
the output is: The first "float" of position is copied to v0.x, the second to v0.w and the third is ignored. First "float" of diffuse color is copied to v0.y, second is ignored. v0.z is set to default value, which is zero.
DEF—floating point constant definition
DEFI—integer constant definition
DEFB—boolean constant definition DP3—Three element dot product of vector operands
DP4—Four element dot product of vector operands
DST—Calculate the distance vector
END—end of shader
EXP—full precision 2 power X
EXPP—partial precision 2 power X
FRC—fraction
LABEL—define a label
LIT—Partial Lighting Calculation
LOG—full precision base-2 logarithm of X
LOGP—partial precision base-2 logarithm of X
LRP—linear interpolation
M4x4—Four dot products of 4-element vectors
M4x3—Three dot products of 4-element vectors
M3x4—Four dot products of 3-element vectors
M3x3—Three dot products of 3-element vectors
M3x2—Two dot products of 3-element vectors
MAD—multiply and add vector operands
MAX—computes maximum value of vector operands
MIN—computes minimum value of vector operands
MOV—move floating point data between registers
MOVA—move data from floating point to integer register
MUL—multiply vector operands
NOP—No Operation
NRM—Normalization
POW—vector x power y
RCP—reciprocal value
RSQ—reciprocal square root
SGE—computes sign if greater or equal
SGN—computes sign
SINCOS—computes sine and cosine For SINCOS, for an implementation that does not implement sincos natively, taylor coefficients are set up in constants behind the scenes (the 2 extra parameters to sincos are removed, and the user does not need to provide them). Also, components in dest writemask (.x, .y or .xy) are the ones that are touched. Predication of this instruction may be orthogonal.

SLT—computes sign if less

With respect to DDI changes to vertex shaders in accordance with the invention, a new DDI only Renderstate is provided:

D3DRS_MAXVERTEXSHADERINST with (DWORD) representing the max number of instructions that can be executed.

The legal values for this renderstate are integers that are powers of 2, and if any other integer is set, the next nearest power of 2 number is assumed. The new DDI only Renderstate Defaults to D3DINFINITEINSTRUCTIONS. Support for this feature involves an additional register, instruction modifier and a new instruction.

With respect to the register, an additional predicate register is supported. This is a boolean vector register that is modified via the Setup instruction defined below in Table II. IN one embodiment, there are no defaults for this register so an application sets it prior to use.

Register Type Count r/w #read-ports #reads/inst Dimension RelAddr Defaults Requires DCL Predicate(p#) 1 r/w 1 1 4 n/a none n

TABLE II

Predicate Register

The following new instructions are supported.

SETP - Set the predicate register
Instruction:
setp_cmp dst, src0, src1
Format:
Op code token D3DSIO_SETP
Dest token
Source0 token
Source1 token
Operation:
per channel in dest write mask.
{
dst.channel = src0.channel cmp src1.channel;
}

For each channel that can be written according to the destination write mask, the boolean result of the comparison operation between the corresponding channels of src0 and src1 is saved (after the source modifier swizzles have been resolved). Source swizzles and destination write masks are heeded. In one embodiment, the p register is the Dest token.

An instruction modifier with the predicate is also supported. This instruction modifier costs an additional instruction slot and exemplary non-limiting syntax is as follows:
[[!](p[.swizzle])] InstOpcode Instruction_Parameters;
e.g. (p.x) add_sat r0.xy, r1, r2
e.g. (!p) mul r0, r1, r2

The destination write mask may be "and"-ed (joined) with the per channel predicate boolean value and the data written back into the destination (after the usual application of the instruction modifiers), without side effects, i.e., this update does not change the predicate register. Swizzles allowed inside the instruction modifier include full (.xyzw) or replicate (.x, .y, .z, .w). The presence of a (!) inside the modifier reverses the meaning of the predicate bits.

In one non-limiting embodiment, the instruction modifier is syntactically present before the opcode, but in the binary format, it is the tailing token.

In one embodiment, all instructions except the following can be predicated: SETP, IF, ELSE, ENDIF, DCL, DEF, DEFI, DEFB, END, CALL, CALLNZ, RET, LOOP, ENDLOOP, REP, ENDREP, IFC, BREAKC and BREAK.

With respect to predication's interaction with flow control, predication can be used orthogonally with the dynamic and static flow control, described above. IF, CALLNZ and BREAKP accept the predicate register as a parameter also.

As mentioned in the background with respect to FIG. 4, the state of the art currently does not support vertex stream frequency division. Thus, as illustrated in FIG. 10A, the invention advantageously supports the ability to specify how often data is input for processing from respective vertex data streams VDS1 to VDSN, i.e., to specify how many cycles of the execution engine of vertex shader VS are completed before receiving another data point from a designated vertex stream. For instance, as specified via graphics API GAPI, the data of vertex data stream VDS1 is processed one vertex every cycle, whereas the data of vertex of vertex data stream VDSN is processed one vertex every three cycles. This might be useful, for instance, for processing triangles, which have 3 vertices such that after processing every triangle, a different data point from vertex data stream VDSN is input to the process.

In the older shader models (including the fixed function), the vertex shader was invoked once per vertex; with every invocation, the input registers were initialized with unique vertex elements from the vertex streams. The frequency division feature of the invention advantageously allows a subset of the input registers to be initialized at a less frequent rate.

Two exemplary non-limiting APIs are introduced for the frequency division of vertex streams in accordance with the invention: SetStreamSourceFrequency(UINT StreamIndex, UINT Frequency) and a corresponding Get* method. In one embodiment, the Frequency is a value greater than zero and can be at most 2^16-1 (WORD).

The application sets a frequency for a given stream, and the elements in that stream are affected by this value. Frequency is "after how many vertices is the data from that stream fetched into the vertex processing machine," i.e., if it is 2, then the data from that stream is fetched into the Vn registers every 2 vertices of processing. In an exemplary embodiment, the vertex offset (in the VB) is computed using the following formula:

VertexOffset=StartVertex/Divider*StreamStride+VertexIndex/Divider*StreamStride+StreamOffset It is noted that the division is an integer division, that StartVertex, which is provided in DrawPrimitive calls, is also divided by the frequency divider and the state is recorded in state blocks as vertex state. Stream frequency may be ignored for indexed primitives.

Exemplary non-limiting API changes that support this feature include the following:

```
HRESULT IDirect3DDevice9::SetStreamSourceFreq(UINT StreamIndex, UINT Frequency);
HRESULT IDirect3DDevice9::GetStreamSourceFreq(UINT StreamIndex, UINT* Frequency);
Exemplary non-limiting DDI changes that support this feature include the following:
D3DDP2OP_SETSTREAMSOURCEFREQ          // New DP2 Command
typedef struct_D3DHAL_SETSTREAMSOURCEFREQ  // New structure corresponding
{                                      // with the command
UINT StreamID;
UINT Frequency;
}D3DHAL_DP2SETSTREAMSOURCEFREQ,
*LPD3DHAL_DP2SETSTREAMSOURCEFREQ;
```

FIG. 10B illustrates an exemplary technique that can be achieved more easily with the vertex stream frequency division of the invention. Geometry instancing is a way of applying the same graphics object to many different positions in the same plane of an output. For instance, a developer of a graphics application may wish to replicate a tree to create a forest of trees, without recreating the tree each time. In the past, considerable host processing and memory was consumed to gain the efficiencies of geometry instancing. However, with the frequency division of vertex streams in accordance with the invention, a program could specify that one vertex stream include tree data, and another include positional data. Thus, a program P could grab one positional data point every time the tree data is consumed, and the tree data may therefore advantageously be placed in video memory. Geometry instancing thus becomes very fast using the frequency division feature of the invention.

As mentioned above, the invention includes a method of using a vertex stream frequency divider via a graphics instancing API. The present invention provides an alternate improved method of frequency dividing by adding a stream modulo value. Instead of the frequency divider only applying to non-indexed primitives, as described below in exemplary non-limiting detail, the frequency divider and the modulo are extended to indexed primitives.

The goal of the instancing API is to allow drawing of multiple instances of the same object with different per-instance data in one API call. The following changes have been made to the API to achieve this:

SetStreamSourceFreq(Stream, Value) API can specify a modulo or a divider.

Stream divider and modulo can now be applied to indexed primitives

When using the instancing API the primitive count is usually equal to the number of instances multiplied to the number of primitives per instance. There is no reset of the primitive during a drawing call.

Exposing the Support of the New API

A new cap D3DVTXPCAPS_STREAMMODULO is introduced to expose the modulo support.

The stream divider/modulo is ignored when the fixed function vertex pipeline or a vertex shader prior to the invention is used.

SetStreamSource(Stream, Value)

define D3DSTREAMSOURCEMODULO 0x8000000

When the D3DSTREAMSOURCEMODULO bit is set in the Value then it represent a modulo value instead of a divider.

Example:

SetStreamSourceFreq(0, 100|D3DSTREAMSOURCEMODULO);

The modulo is a positive non-zero value.

For indexed primitives any number of streams can have a modulo assigned to them and these values can be different.

For indexed primitives all modulo values, assigned to streams, are the same. The stream dividers is a multiple of the modulo value.

Non-indexed Primitives

DrawPrimitive(PrimitiveType, StartVertexIndex, PrimitiveCount)

The vertex offsets for each stream are computed according to the following pseudo-code:

```
NumVertices = f(PrimitiveCount, PrimitiveType);
for (Counter=0; Counter < NumVertices; Counter++)
{
If (a stream is marked as having a modulo)
{
        VertexIndex = StartVertex + (Counter % StreamDivider)
}
else
{
        VertexIndex = (StartVertex + Counter) / StreamDivider;
}
VertexOffset = VertexIndex * StreamStride + StreamOffset;
}
```

-continued

```
Indexed primitives
DrawIndexedPrimitive (
    PrimitiveType,
    Base VertexIndex,      // Vertex, which corresponds to index 0
    StartVertex,           // Vertex, which corresponds to the min
                           // index value in
                           // the index buffer
    NumberOfVertices,      // Number of vertices, used in an
                           // instance of an object
    StartIndex,            // Start index in the index buffer
    PrimitiveCount         // Number of primitives in an instance
)
```

Streams, which are not marked as having a modulo value and the frequency divider is greater than one, are not indexed. The vertex offsets for each stream are computed according to the following pseudo-code:

```
NumIndices = f(PrimitiveCount, PrimitiveType);
for (Counter=0; Counter < NumIndices; Counter++)
{
    If (a stream is marked as having a modulo || StreamDivider == 1)
    {
        VertexIndex = BaseVertexIndex + IndexBuffer[StartIndex +
            (Counter % StreamDivider)]
    }
    else
    {
        VertexIndex = (StartVertex + Counter) / StreamDivider;
    }
    VertexOffset = VertexIndex * StreamStride + StreamOffset;
}
```

Usage Scenarios
Non-indexed Primitive
A triangle list is used.
An object instance has NVER vertices.
The number of instances of N.
Stream 0 has NVER vertex positions of an object
Stream 1 has NVER vertex normals of an object.
Stream 2 has N matrices. Each matrix is applied to an instance of an object.
SetStreamSourceFreq(0, NVER|D3DSTREAMSOURCEMODULO);
SetStreamSourceFreq(1, NVER|D3DSTREAMSOURCEMODULO);
SetStreamSourceFreq(2, NVER);
DrawPrimitive(D3DPT_TRIANGLELIST, 0, N*(NVER/ 3));
Indexed Primitive
An indexed triangle list is used.
An index stream NINDEX indices.
An object instance has NVER vertices.
The number of instances of N.
Stream 0 has NVER vertex positions of an object
Stream 1 has NVER vertex normals of an object.
Stream 2 has N matrices. Each matrix is applied to an instance of an object.
SetStreamSourceFreq(0, NINDICIES|D3DSTREAMSOURCEMODULO);
SetStreamSourceFreq(1, 1);
SetStreamSourceFreq(2, NINDICES);
DrawIndexedPrimitive(D3DPT_TRIANGLELIST, 0,0, NVER,N*(NINDICES/3));
It is noted that the stream 1 is indexed, because the divider value is equal to one. The stream 2 is not indexed.

Table III shows how slot counts for vertex shaders have evolved to the point of the present invention, wherein model1 and model2 refer to previous shader models for comparison, as follows:

TABLE III

Exemplary Vertex Shader Instruction Slot Consumption

| Instruction | model1 | model2 | the invention |
|---|---|---|---|
| Total | 256 | 256 | 512(min) |
| abs | 1 | 1 | 1 |
| add | 1 | 1 | 1 |
| break | n/a | 1 | 1 |
| breakc | n/a | 3 | 3 |
| breakp | n/a | 3 | 3 |
| call | 2 | 2 | 2 |
| callnz b | 3 | 3 | 3 |
| callnz p | n/a | 3 | 3 |
| crs | 2 | 2 | 2 |
| del | n/a | n/a | n/a |
| def | n/a | n/a | n/a |
| defi | n/a | n/a | n/a |
| defb | n/a | n/a | n/a |
| dp3 | 1 | 1 | 1 |
| dp4 | 1 | 1 | 1 |
| dst | 1 | 1 | 1 |
| else | 1 | 1 | 1 |
| endif | 1 | 1 | 1 |
| endloop | 2 | 2 | 2 |
| endrep | 2 | 2 | 2 |
| exp | 1 | 1 | 1 |
| expp | 1 | 1 | 1 |
| frc | 1 | 1 | 1 |
| if b | 3 | 3 | 3 |
| if p | n/a | 3 | 3 |
| ifc | n/a | 3 | 3 |
| label | 0 | 0 | 0 |
| lit | 3 | 3 | 3 |
| log | 1 | 1 | 1 |
| logp | 1 | 1 | 1 |
| loop | 3 | 3 | 3 |
| lrp | 2 | 2 | 2 |
| m3x2 | 2 | 2 | 2 |
| m3x3 | 3 | 3 | 3 |
| m3x4 | 4 | 4 | 4 |
| m4x3 | 3 | 3 | 3 |
| m4x4 | 4 | 4 | 4 |
| mad | 1 | 1 | 1 |
| max | 1 | 1 | 1 |
| mov | 1 | 1 | 1 |
| mova | 1 | 1 | 1 |
| min | 1 | 1 | 1 |
| mul | 1 | 1 | 1 |
| nop | 1 | 1 | 1 |
| nrm | 3 | 3 | 3 |
| pow | 3 | 3 | 3 |
| rcp | 1 | 1 | 1 |
| rep | 3 | 3 | 3 |
| ret | 1 | 1 | 1 |
| rsq | 1 | 1 | 1 |
| setp | n/a | 1 | 1 |
| sge | 1 | 1 | 1 |
| sgn | 3 | 3 | 3 |
| sincos | 8 | 8 | 8 |
| slt | 1 | 1 | 1 |
| texldl | n/a | n/a | 2+3CUBE |
| ALL: |  | PRED+1 | PRED+1 |

II. Pixel Shaders

Figure 11A:
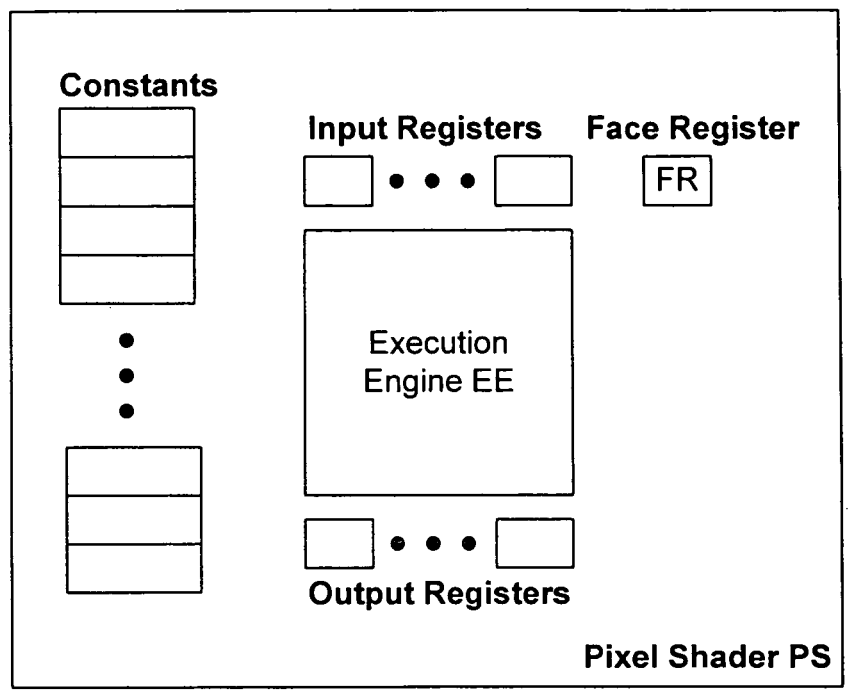
FIGS. 11A and 11B illustrate the inclusion and use of a face register in pixel shaders in accordance with the invention.
Figure 11B:
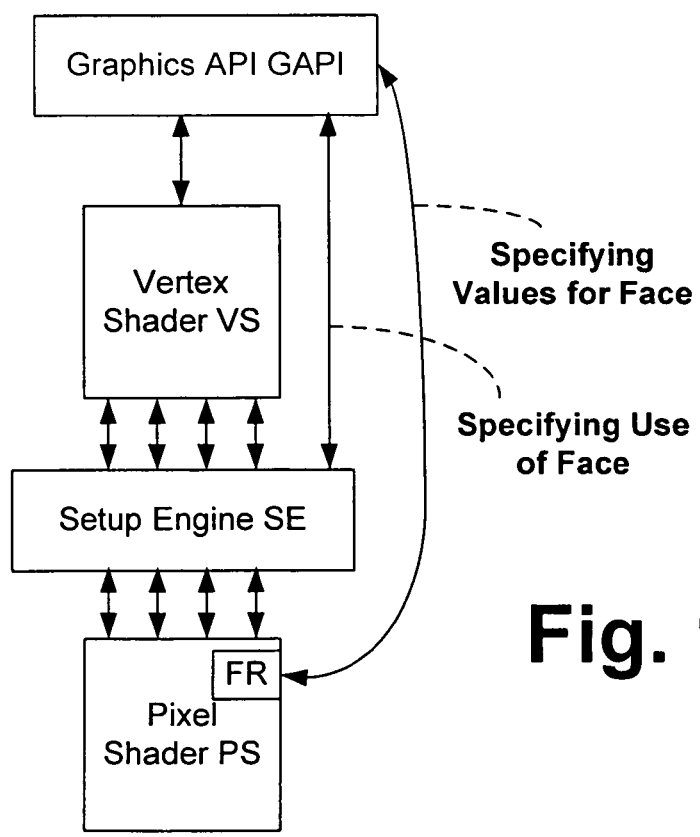

As mentioned in the background in connection with FIGS. 5A and 5B, a face register is not currently available for use in connection with a pixel shader. Thus, as illustrated in FIG. 11A, a pixel shader PS in accordance with the invention, in addition to including constants, input and output registers, etc. also includes a face register FR. As illustrated in FIG. 11B, this enables a program P downloaded to pixel shader PS to operate upon pixels in a way that takes its face, whether forward or backward, into account. This enables a shader program P, for instance, to perform one sided, or double sided lighting effects. In one embodiment, the face register is a floating point scalar register that may contain the primitive area, or appropriate sign. Using the appropriate sign, if the value is less than zero (sign bit is set, negative) the primitive is the back face (the area is negative, CounterClockwise). Hence, inside the pixel shader, the application can make a decision as to which lighting technique to use. Two-sided lighting can be achieved this way. In one embodiment, this register requires a declaration, e.g., by the setup engine SE or graphics API GAPI. The register FR may be undefined for lines and point primitives. The face register FR can be used with the setp and ifc instructions (as one half of a comparison). In embodiments relying on the sign of the bit, it makes sense to compare this register against 0 (>0, or <0).

A position register is also provided for pixel shaders in accordance with the invention, including the current pixels (x, y) in the corresponding channels. The (z, w) channels are undefined. This register is declared. When multisampling, the (x, y) contain the pixel coordinates and not the sample coordinate (multisampling happens once per pixel). When the driver performs super sampling and the pixel shader is run multiple times per pixel, the (x, y) should contain the resolved coordinate, that is, normalized by the render-target bloat factor.

The Boolean and integer constants for pixel shaders in accordance with the invention can be set using an API defined in accordance with the invention, and described in more detail below.

With respect to pixel shader input registers, The input registers for pixel shaders in accordance with the invention fully support floating point and the t# registers have been consolidated into the input registers. The DCL at the top of the shader is used to describe what is contained in a particular input register, and a semantic for the pixel types is introduced. No clamping is performed when the input registers are defined as colors (like texture coordinates). The evaluation of the registers defined as color differs from the texture coordinates when multisampling. These registers can be indexed using the aL register.

Exemplary declaration syntax is as follows:
dcl_SomeSemantic[_centroid] v[.write_mask]
_SomeSemantic:

The same set of semantics as for the vertex shader output declaration can be used. Semantic names come from the enum D3DDECLUSAGE (and are paired with an index, i.e. position3). The "position" semantic (position0) and the pointsize semantic are not available for pixel shaders. For pixel shaders with flow control, it is assumed that the worst case input is dcl'd. and that there are no defaults if a VS does not actually output what it declares in the input of the pixel shader.

The declarations can have write masks, e.g., as follows:
write_mask:

Write masks allow packing of attributes. However, the packing should match the vertex shader output declaration. Multiple semantics may be defined for individual input registers, as long as the component masks are non-overlapping. In one embodiment, there are no defaults for missing components, and it is validated that vertex shaders output at least enough data for what is requested by the corresponding pixel shader.

An optional instruction modifier that can be applied to the DCL instruction is _centroid. Exemplary use of the _centroid modifier is as follows:

| | |
|---|---|
| dcl_fog vO.x dcl_tangent_centroid vO.yzw | // multiple semantics can be packed // into one register |

To achieve flat shading, when D3DRS_SHADEMODE is D3DSHADE_FLAT, during clipping and triangle rasterization, attributes with D3DDECLUSAGE_COLOR are interpolated as flat shaded. If any components of a register are declared with the semantic name color#, but other components of the same register are given different semantics, then turning on flat shading may result in undefined interpolation (linear vs. flat) on the components in that register with associated semantics other than color.

With respect to pixel shader output registers in accordance with the invention, exemplary non-limiting behavior is as described as follows. Output registers oC# and oDepth can be written any number of times in accordance with the invention. The output of the pixel shader comes from the contents of the output registers at the end of shader execution. If a write to an output register does not happen, perhaps due to flow control or if the shader did not write it, the corresponding rendertarget is also not updated. If a subset of the channels in an output register are written, then undefined values are written to the remaining channels.

Additionally, the oC# registers can be written with any writemasks in accordance with the invention. The renderstates D3DRS_COLORWRITEENABLE, D3DRS_COLORWRITEENABLE1, D3DRS_COLORWRITEENABLE2 and D3DRS_COLORWRITEENABLE3 determine which components of oC# ultimately get written to the rendertarget (after blend, if applicable). If the shader writes some, but not all of the components defined by the D3DRS_COLORWRITEENABLE* renderstates for a given oC# register, then the defined but unwritten channels produce undefined values in the corresponding rendertarget. If NONE of the components of an oC# are written, the corresponding rendertarget is not updated (as stated above), so the D3DRS_COLORWRITEENABLE* renderstates do not apply in such case.

Table IV below illustrates an exemplary non-limiting implementation of registers for a pixel shader in accordance with the class of virtual machine defined by the invention.

TABLE IV

Exemplary Non-Limiting Registers and Corresponding Characteristics

| Register Type | Count | r/w | #read-ports | #reads/inst | Dimension | RelAddr | Defaults | Requires DCL |
|---|---|---|---|---|---|---|---|---|
| Temp (r#) | 32 | r/w | 3 | unlimited | 4 | n | none | n |
| Input(v#) | 10 | r | 1 | unlimited | 4 | aL only | none | y |
| Float Constant (c#) | 224 | r | 1 | unlimited | 4 | n | 0000 | n |

TABLE IV-continued

Exemplary Non-Limiting Registers and Corresponding Characteristics

| Register Type | Count | r/w | #read-ports | #reads/inst | Dimension | RelAddr | Defaults | Requires DCL |
|---|---|---|---|---|---|---|---|---|
| Integer Constant (i#) | 16 | r | 1 | 1 | 4 | n | 0000 | n |
| Bool Constant (b#) | 16 | r | 1 | 1 | 1 | n | FALSE | n |
| Sampler (s#) | 16 | r | 1 | 1 | 4 | n | depends* | y |
| Face (vFace) | 1 | r | 1 | 1 | 1 | n | none | y |
| Position Input(vPos) | 1 | r | 1 | 1 | 4 | n | none | y |
| Loop Counter (aL) | 1 | u | n/a | unlimited | 1 | n/a | none | n |
| Output Registers: | | | | | | | | |
| Color (oC) | #MRT** | w | 0 | 0 | 4 | n | none | n |
| Depth (oDepth) | 1 | w | 0 | 0 | 1 | n | none | n |

In Table IV, "r" corresponds to Read, "w" corresponds to Write and "u" corresponds to Use. For a partial (x, y, z, w), if only a subset of channels are updated in the register, in one embodiment, the remaining channels default to specified values (x, y, z, w). aL only register banks can be addressed using the aL register.

With respect to pixel shader instruction count, the invention supports at least 512 instruction slots. In one embodiment, the maximum number of slot count that is supported is indicated by the cap D3DCAPS9.MaxPixelShader30InstructionSlots. The maximum value that can be set on this cap is 32768. The maximum number of instructions executed is indicated by the cap D3DCAPS9.MaxPShaderInstructionsExecuted, which is at least 0xffff in accordance with a preferred embodiment. This cap can be set to D3DINFINITEINSTRUCTIONS, indicating that the actual number of instructions executed is unlimited.

The total number of instructions executed can be clamped to the DDI-only renderstate D3DRS_MAXPIXELSHADERINST. The legal values for this renderstate are numbers that are powers of 2; if any other integer is set, the next nearest pow2 number is assumed. This renderstate defaults to D3DINFINITEINSTRUCTIONS and there are no additional dependent read limits. In one embodiment, there is no distinction between texture operations and arithmetic operations.

The following modifiers are supported for pixel shaders in accordance with the invention:
(negate): Source modifier—Negation operator.
_abs: Source modifier—Absolute value of the source.
_sat: Instruction modifier—Clamp from 0 to 1.
Arbitrary Swizzles: Source modifier. In this regard, arbitrary swizzles are supported in pixel shaders like in vertex shaders. Arbitrary swizzles work on parameters of texture operations as well.
Swizzles on Samplers: The sampler registers in the texture operations also accept swizzles. This is a way to indicate swizzling of the color channels looked up from the texture by the sampler.
_centroid: The _centroid modifier is supported on DCL instructions which declare the input registers and on Texture lookup instructions.
When set on an input register declaration that is not a "color," "diffuse" or "specular" semantic, the attribute evaluation is altered when multisampling. The attribute evaluation defines that the attribute is to be interpolated clamped in some fashion to the gamut of the attribute across the primitive, when the multisample pixel center is not covered by the primitive. Care should be taken when an attribute marked with _centroid is used for texture sampling since normally, the evaluation is performed at the pixel center. This has no effect on input registers with semantic "color," "diffuse" or "specular," i.e., these attributes are always evaluated as if the _centroid modifier is set.

The _centroid modifier can be also set on the texld* instructions and dsx/dsy instructions. When a texture-coordinate is evaluated at the centroid, the gradient information computed may not be accurate. When this hint is provided, implementations can adjust this gradient computation to be more accurate. In various embodiments, _abs and negate (−) or both (−r0.abs) are supported on reads. If both are present, the abs( ) happens first.

As described in connection with FIGS. 6A and 6B in the background, current pixel shaders cannot support programs that have either staticly defined branching, or dynamically defined branching predicated on runtime behavior. Thus, with respect to the instruction set included in a shader program to be downloaded to a pixel shader in accordance with the invention, the shader program may achieve static flow control, and dynamic flow control, as illustrated in FIGS. 12A and 12B.

Figure 12A:
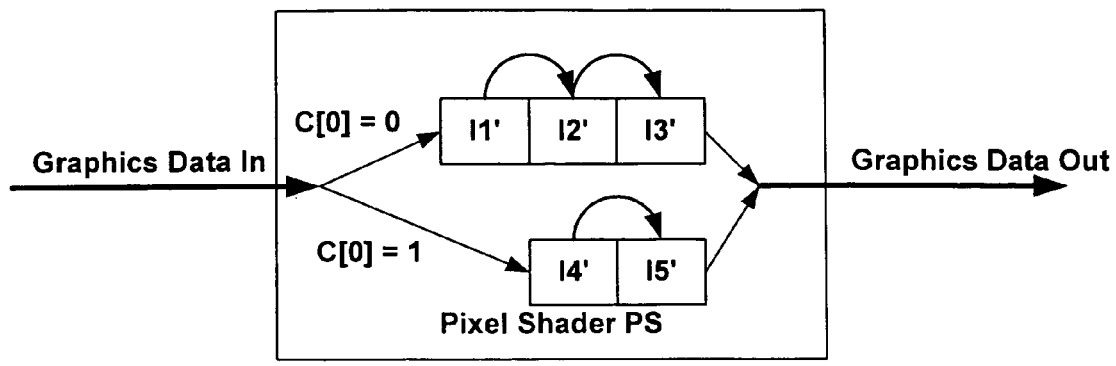
FIGS. 12A and 12B illustrate static and dynamic branching behaviors, respectively, for programs downloaded to pixel shaders in accordance with the present invention.
Figure 12B:
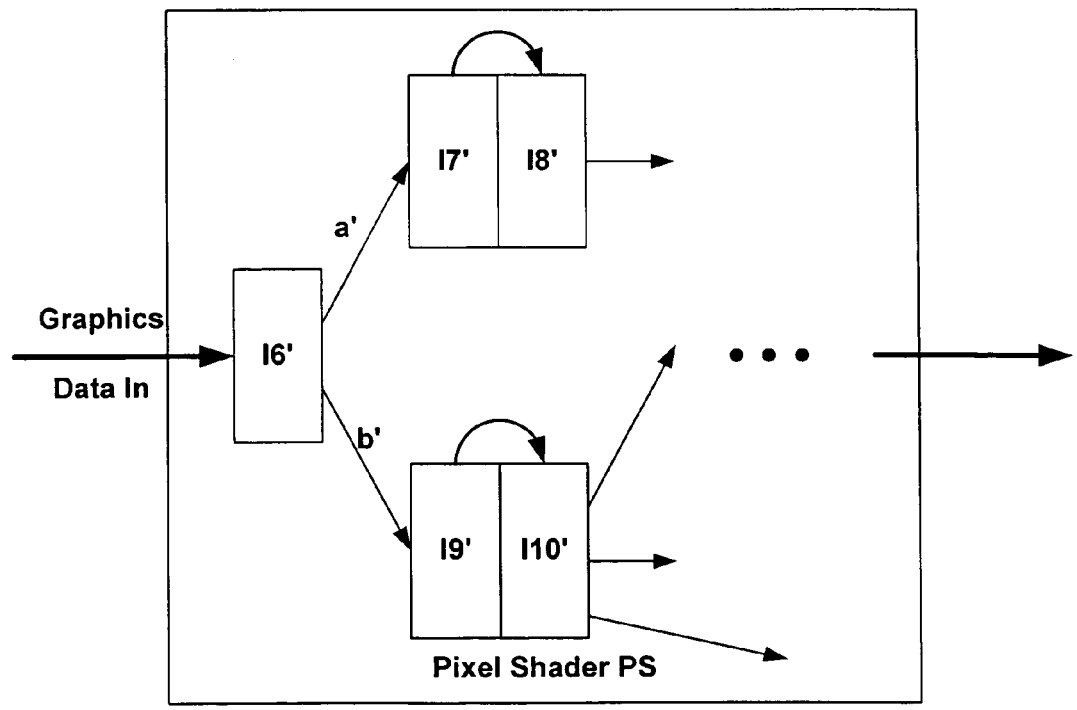

FIG. 12A illustrates that a static flow of a program P for a pixel shader PS can be defined in accordance with the invention, wherein, for instance, the flow is pre-set as determined by a value in constant C[0]. FIG. 12B illustrates that dynamic flow control may be achieved with a program P for a pixel shader PS in accordance with the invention by predicating flow upon the presence or absence of runtime conditions a or b.

With respect to static flow control, the functionality is the same as applies to static flow control for vertex shaders. In one embodiment, the exception to this is that if-else-endif (with boolean) can be nested up to 24-deep.

With respect to dynamic flow control, the functionality is the same as applies to dynamic flow control for vertex shaders. However, in one non-limiting implementation, the output registers (oDepth and oC#) of the pixel shader are not written within dynamic flow control, and cannot be written using predication, though writing to the outputs within static flow control is still alright in this implementation.

Other exemplary pixel shader instructions that may be used in accordance with the invention include:
DSX—Rate of change in the x direction
Instruction:
dsx DST, SRC
Format:
Op code token D3DSIO_DSX
dest token
Src token The DSX instruction computes the rate of change of a given src register in the x-direction. In one embodiment, the DSX instruction computes gradients on the current contents of registers in pixels, regardless of whether pixels in gradient computation are active, either due to flow control or due to being off the edge of a primitive. This implies that the pixels that are utilized for this instruction are executed in lockstep. Dest Token accepts all write masks. Src Token accepts all swizzles. Src modifiers (negate/abs/abs+neg) are not allowed, although the saturate instruction modifier is permitted.

DSY—Rate of change in the y direction
Instruction:
dsy DST, SRC
Format:
Op code token D3DSIO_DSY
dest token
Src token The DSY instruction computes the rate of change of a given src register in the y-direction. The DSY instruction computes gradients on the current contents of registers in pixels, regardless of whether pixels in gradient computation are active, either due to flow control or due to being off the edge of a primitive. This implies that the pixels that are required for this instruction are executed in lockstep. Dest Token accepts all write masks. Src token accepts all swizzles. Src modifiers (negate/abs/absneg) are not allowed, although the saturate instruction modifier is permitted.

TEXLDD—Load a texture, with additional texture coordinate gradient inputs
Instruction:
texldd DST, SRC0 (texcoords), SRC1 (sampler), SRC2 (dsx), SRC3 (dsy)
Format:
Op code token D3DSIO_TEXLDD
dest token
Src0 token
Src1 token
Src2 token
Src3 token The TEXLDD instruction samples a texture using the texture coordinates at SRC0, the sampler specified by SRC1, and the gradients DSX and DSY coming from SRC2 and SRC3. In various embodiments, all sources support arbitrary swizzles and all write-masks are valid on the destination. D3DSAMP_MAXMIPLEVEL and D3DSAMP_MIPMAPLODBIAS are honored. SRC1 can only be a sampler register.
Sampler Declaration Statement: dcl_*s#
Input-Color/Texture-Coordinate Declaration Statement: dcl v#/t#
Texture Load: texld[b|p]

For the texture load statement, all sources support arbitrary swizzles. All write-masks are valid on the destination. In one embodiment, the bias value in the TEXLDB instruction can range between [−16.0, +15.0], and bias values outside this range produce undefined results.
Kill Pixel: texkill For the texkill statement, sources support arbitrary swizzles.
TEXLDL—Texture lookup with a provided LOD
Instruction:
texldl dest, src0, src1
Format:
OpCode with comparison token D3DSIO_TEXLDL
Destination token.
Source token 0
Source token 1

Using provided texture coordinates, the TEXTDL instruction for pixel shaders samples a texture at a particular sampler. The particular LOD being sampled is specified as the 4th component of the texture coordinate. src0 provides the texture coordinates for the texture sample. src1 identifies the sampler (s#), where # specifies which texture sampler number to sample. Associated with a sampler are 1) a texture and 2) control state defined by the D3DSAMPLERSTATETYPE enumerant (e.g., D3DSAMP_MINFILTER).

TEXTDL looks up the texture set at the sampler stage referenced by src1. The LOD is not computed, simply src0.w is the LOD that is selected. This value can be negative in which case the LOD selected is the zero'th one (biggest map) with the MAGFILTER. Since src0.w is a floating point value, the fractional value is used to interpolate (if MIPFILTER is LINEAR) between two mip levels. Sampler states MIPMAPLODBIAS and MAXMIPLEVEL are honored.

In one embodiment, if a shader program samples from a sampler that does not have a texture set, then 0001 is obtained in the destination register.

The following exemplary algorithm that the reference rasterizer (refract) follows is provided for reference:

```
LOD = src0.w + LODBIAS;
if (LOD <= 0 )
{
LOD = 0;
Filter = MagFilter;
tex = Lookup( MAX(MAXMIPLEVEL, LOD), Filter );
}
else
{
Filter = MinFilter;
LOD = MAX( MAXMIPLEVEL, LOD);
tex = Lookup( Floor(LOD), Filter );
if( MipFilter == LINEAR )
{
tex1 = Lookup( Ceil(LOD), Filter );
tex = (1 - frac(src0.w))*tex + frac(src0.w)*tex1;
}
}
```

In general, the texture coordinates should not be scaled by texture size. dst is r# and can accept a writemask. In various non-limiting embodiments, defaults for missing components are either 0 or 1, and depend on the texture format. Refrast source lists the defaults. src1 is s#, with no negate, but it can support swizzle. The s# is dcl'd at the beginning of the shader program.

The number of coordinates required to perform the texture sample depends on how the s# was dcl'd. If it was dcl'd as a cube, a 3 component texture coordinate is used (.rgb). Sampling a texture with lower dimensions than are present in the texture coordinate is allowed, and it is assumed to ignore the extra texture coordinate components. Conversely, sampling a texture with higher dimensions than are present in the texture coordinate cannot be performed.

In various non-limiting embodiments the following conditions apply. If src0 (texture coordinate) is r#, the components required for the lookup (described above) must have been previously written. Sampling unsigned RGB textures results in float values between 0.0 and 1.0. Sampling signed textures results in float values between −1.0 to 1.0. For sampling floating point textures: Float16->MAX_FLOAT16 range preserved and Float32->Max range of pipeline preserved. There is no dependent read limit. Additional instructions for pixel shaders include:

Nop: nop
Add: add
Move: mov
Multiply: mul
Multiply-Add: mad
DEF—floating point constant definition
DEFI—integer constant definition
DEFB—boolean constant definition
2-D Dot Product+Add: dp2add
3-D Dot Product: dp3
4-D Dot Product: dp4
Fractional Component: frc
Reciprocal: rcp
Reciprocal Square Root: rsq
Exponential Base 2: exp
Logarithm Base 2: log
Compare: cmp
Minimum: min
Maximum: max
Linear Interpolation: LRP
Exponentiation: POW
Cross Product: CRS
Normalization: NRM
Absolute Value: ABS
Sine, Cosine: SINCOS An implementation that does not support SINCOS natively sets up taylor coefficients in constants behind the scenes. Only components in dest writemask (.x, .y or .xy) are touched and predication of SINCOS is orthogonal.

M4x4—Four dot products of 4-element vectors
M4x3—Three dot products of 4-element vectors
M3x4—Four dot products of 3-element vectors
M3x3—Three dot products of 3-element vectors
M3x2—Two dot products of 3-element vectors With respect to predication, this is the same as for the vertex shader.

API changes for pixel shaders implicated by the invention include:

HRESULT Idirect3DDevice9::SetPixelShaderConstantF (UINT StartRegister, CONST float* pConstantData, UINT Vector4fCount);
HRESULT IDirect3DDevice9::GetPixelShaderConstantF (UINT StartRegister, float* pConstantData, UINT Vector4fCount);
HRESULT IDirect3DDevice9::SetPixelShaderConstantI (UINT StartRegister, CONST int* pConstantData, UINT Vector4iCount);
HRESULT IDirect3DDevice9::GetPixelShaderConstantI (UINT StartRegister, int* pConstantData, UINT Vector4iCount);
HRESULT IDirect3DDevice9::SetPixe]ShaderConstantB (UINT StartRegister, CONST BOOL* pConstantData, UINT BoolCount);
HRESULT IDirect3DDevice9::GetPixelShaderConstantB (UINT StartRegister, BOOL* pConstantData, UINT BoolCount);

DDI changes for pixel shaders implicated by the invention include:

```
// New Renderstate
D3DRS_MAXPIXELSHADERINST // (DWORD) Max number of
instructions that can be executed.
// The legal values for this renderstate are integers that are powers of 2;
// if any other integer is set, the next nearest pow2 number is assumed.
// Defaults to D3DINFINITEINSTRUCTIONS
```

Software implementations (runtime and ref, for VS and ref for PS) of shaders have some validation relaxed in accordance with the invention, which can be useful for debugging and prototyping purposes.

With respect to pixel shader core precision requirements, the invention supports a mechanism that applications use to choose between full precision and partial precision hardware processing capabilities on hardware that supports this choice.

The pixel shader virtual machine of the invention provides support for 2 levels of precision: Full precision (fp32 or higher); this precision level is required and must be supported by the implementation and Partial precision _pp (fp16=s10e5); this precision level is optional and need not be supported by the implementation.

By default all operations occur at the full precision level; the mechanism for overriding this default is the _pp modifier, which may be used by shader code to indicate areas where the application deems partial precision acceptable, provided that the underlying implementation supports it. Implementations are always free to ignore the modifier and perform the affected operations in full precision.

The _pp modifier can occur in two contexts: (1) On a texture coord decl to enable texture coordinates to be passed to the pixel shader in partial precision form. This allows, for example, the use of texture coordinates to relay color data to the pixel shader, which may be faster with partial precision than with full precision in some implementations. In the absence of this modifier, texture coordinates must be passed in full precision; and (2) On any instruction to request the use of partial precision, including texture load instructions. This indicates that the implementation is allowed to execute the instruction with partial precision and store a partial precision result. In the absence of an explicit modifier, the instruction is performed at full precision (regardless of the precisions of the input operands).

In addition to scenarios where an application might deliberately choose to trade off precision for performance, there are several kinds of shader input data which present themselves with less precision and which are natural candidates for partial precision processing. For instance, color iterators are accurately represented by partial precision values (or less, though no less than 8-bit). Texture values from most formats also can be accurately represented by partial precision values (values sampled from 32-bit floating point format textures are an obvious exception). Constants may be represented by partial precision representation as desired.

In all these cases the developer may choose to use _pp instructions to process the data, knowing that no input data precision is "lost" (with the caveat that in some situations numerical considerations may require that some internal steps of a calculation be performed at full precision even when input and final output values do not have more than partial precision.)

Table V shows how slot counts for pixel shaders have evolved to the point of the present invention, wherein model1 and model2 refer to previous shader models for comparison, as follows:

TABLE V

Exemplary Pixel Shader Instruction Slot Consumption

| Instruction | model1 | model2 | the invention |
|---|---|---|---|
| Total | 96 | 512(max) | 512(min) |
| Arith | 64 | 512(max) | 512(min) |
| Tex | 32 | 512(max) | 512(min) |
| abs | 1 | 1 | 1 |
| add | 1 | 1 | 1 |
| break | n/a | 1 | 1 |
| breakc | n/a | 3 | 3 |
| breakp | n/a | 3 | 3 |
| call | n/a | 2 | 2 |
| callnz b | n/a | 3 | 3 |
| callnz p | n/a | 3 | 3 |
| cmp | 1 | 1 | 1 |
| crs | 2 | 2 | 2 |
| dcl | n/a | n/a | n/a |
| def | n/a | n/a | n/a |
| defi | n/a | n/a | n/a |
| defb | n/a | n/a | n/a |
| dsx | n/a | 2 | 2 |
| dsy | n/a | 2 | 2 |
| dp2add | 2 | 2 | 2 |
| dp3 | 1 | 1 | 1 |
| dp4 | 1 | 1 | 1 |
| else | n/a | 1 | 1 |
| endif | n/a | 1 | 1 |
| endloop | n/a | n/a | 2 |
| endrep | n/a | 2 | 2 |
| exp | 1 | 1 | 1 |
| frc | 1 | 1 | 1 |
| if b | n/a | 3 | 3 |
| if p | n/a | 3 | 3 |
| ifc | n/a | 3 | 3 |
| label | n/a | 0 | 0 |
| log | 1 | 1 | 1 |
| loop | n/a | n/a | 3 |
| lrp | 2 | 2 | 2 |
| m3x2 | 2 | 2 | 2 |
| m3x3 | 3 | 3 | 3 |
| m3x4 | 4 | 4 | 4 |
| m4x3 | 3 | 3 | 3 |
| m4x4 | 4 | 4 | 4 |
| mad | 1 | 1 | 1 |
| min | 1 | 1 | 1 |
| max | 1 | 1 | 1 |
| mov | 1 | 1 | 1 |
| mul | 1 | 1 | 1 |
| nop | 1 | 1 | 1 |
| nrm | 3 | 3 | 3 |
| pow | 3 | 3 | 3 |
| rcp | 1 | 1 | 1 |
| rep | n/a | 3 | 3 |
| ret | n/a | 1 | 1 |
| rsq | 1 | 1 | 1 |
| setp | n/a | 1 | 1 |
| sincos | 8 | 8 | 8 |
| texld | 1(tex) | (1+3CUBE)* | 1+3CUBE |
| texldb | 1(tex) | 6* | 6 |
| texldp | 1(tex) | (3+1CUBE)* | 3+1CUBE |
| texldd | n/a | 3 | 3 |
| texldl | n/a | n/a | 2+3CUBE |
| texkill | 1(tex) | 2* | 2 |
| ALL: | | PRED+1 | PRED+1 |

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for downloading algorithmic elements to a coprocessor in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes. Graphics data, such as images (e.g., photos) and video (e.g., movies, advertisements, etc.) continue to proliferate on networks and may be particularly relevant to those computing devices operating in a network or distributed computing environment, and thus the techniques for downloading algorithmic elements to a coprocessor in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the systems and methods for downloading algorithmic elements to a coprocessor of the invention.

Figure 13A:
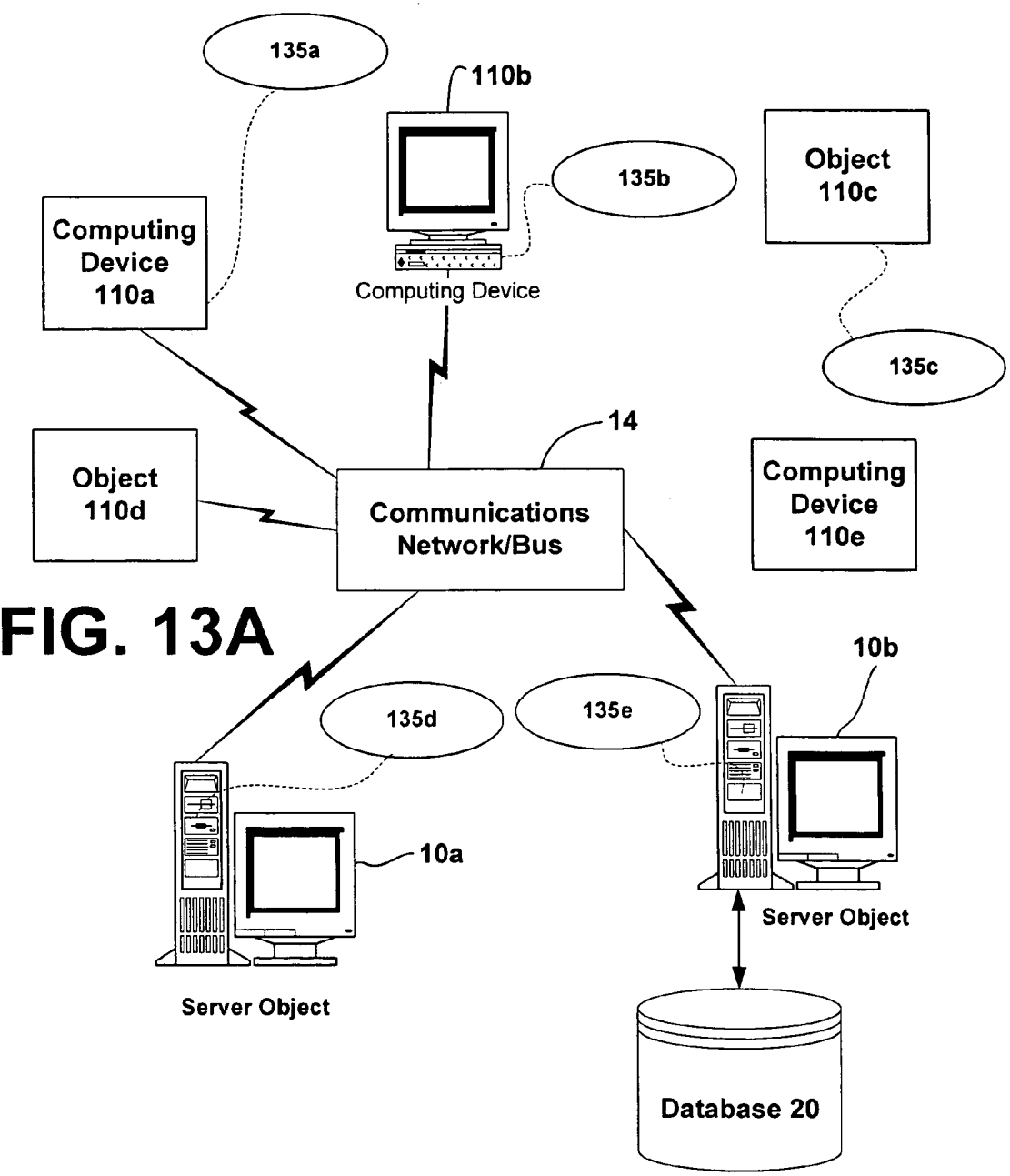
FIG. 13A is a block diagram representing a suitable computing system environment in which the present invention may be implemented.

FIG. 13A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 13A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the systems and methods for downloading algorithmic elements to a coprocessor in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to downloading algorithmic elements to a coprocessor according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of graphics data, and consequently, moving forward, computing devices will require ways of sharing data, such as data accessed or utilized incident to program objects, which may be downloaded to a coprocessor in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 13A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the interfaces associated with downloading programs to coprocessors in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for downloading algorithmic elements to a coprocessor of the invention may be distributed across multiple computing devices or objects.

Client(s) and server(s) communicate with one another utilizing the functionality provided by protocol layer(s). For example, HyperText Transfer Protocol (HTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 13A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to download algorithmic elements to a coprocessor.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 13B:
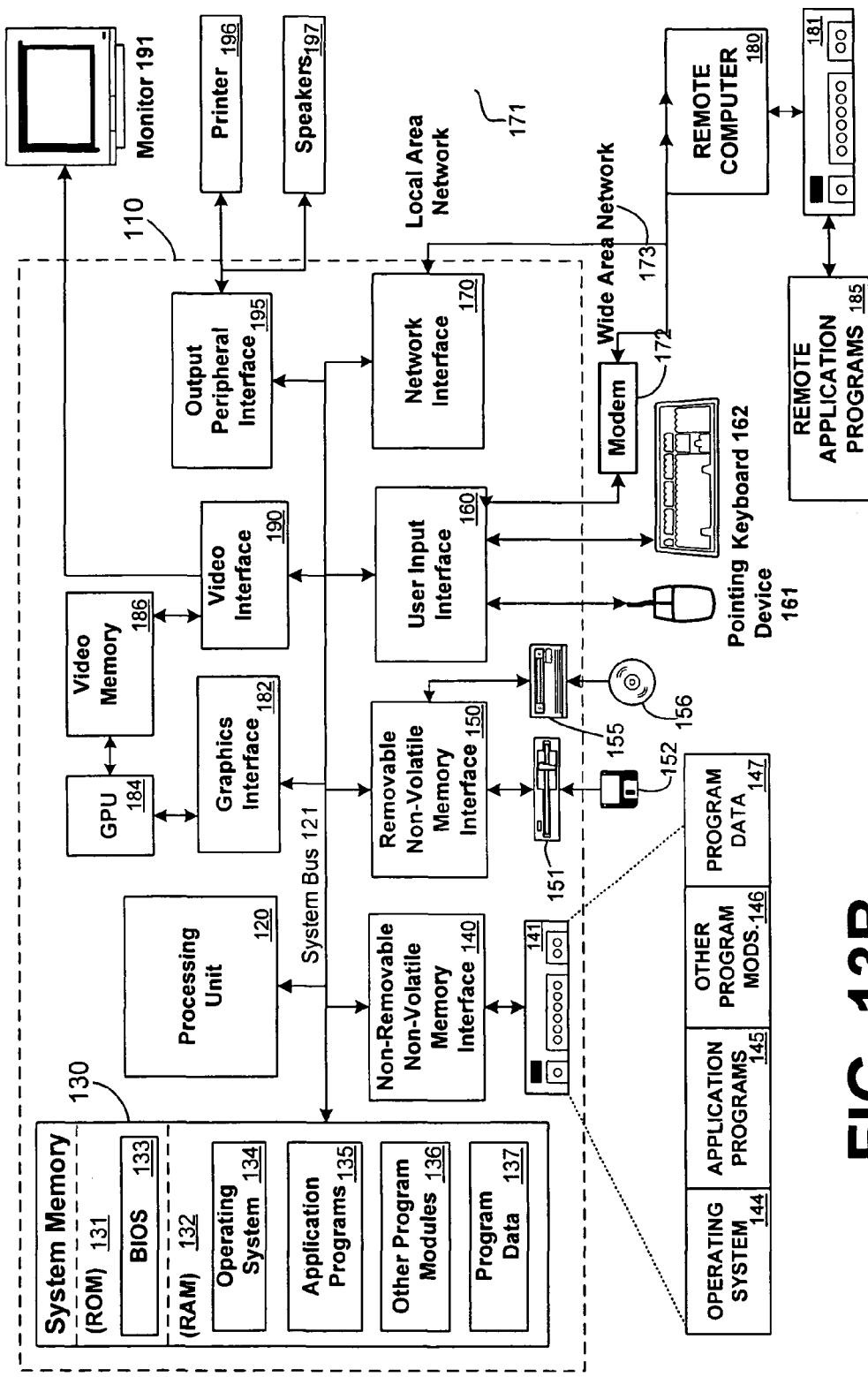
FIG. 13B is a block diagram representing an exemplary network environment in which the present invention may be implemented.

FIG. 13B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that it is desirable to flexibly, but quickly process graphics data in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for downloading algorithmic elements to a coprocessor in accordance with the invention.

Although not required, the invention can be implemented via an operating system, for use by a developer of services for a device or object, and/or included within application software that operates in connection with methods for downloading algorithmic elements to a coprocessor of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 13B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 13B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 13B illustrates operating system 134, application programs 135, other program modules 136, and program data 137.

The computer 110 may also include other removable/non-removable, volatile/nonvolatile computer storage media. By way of example only, FIG. 13B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 13B provide storage of computer readable instructions, data structures, program modules and other data for the computer 110. In FIG. 13B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more coprocessors, such as graphics processing units (GPUs) 184, may communicate with graphics interface 182. In this regard, GPUs 184 generally include on-chip memory storage, such as register storage and GPUs 184 communicate with a video memory 186, wherein the methods for downloading algorithmic elements to a coprocessor of the invention have particular impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 13B. The logical connections depicted in FIG. 13B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 13B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for downloading algorithmic elements to a coprocessor in accordance with the invention may be included in, supported in or accessed via all of the languages and services enabled by managed code, such as NET code, and in other distributed computing frameworks as well.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 14A:
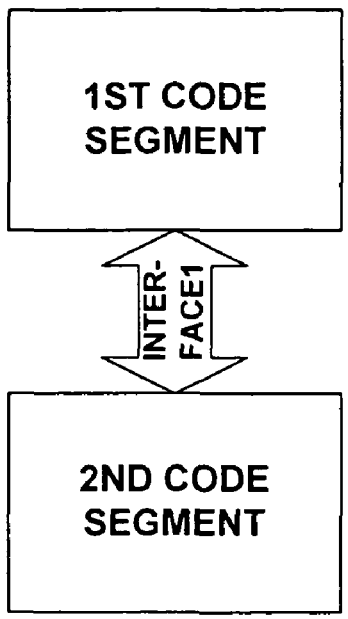
Figure 14B:
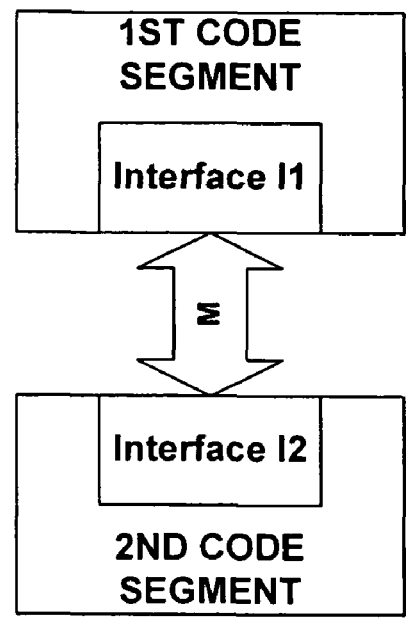

Notionally, a programming interface may be viewed generically, as shown in FIG. 14A or FIG. 14B. FIG. 14A illustrates an interface Interfac18A as a conduit through which first and second code segments communicate. FIG. 14B illustrates an interface as comprising interface objects I1 and I2 (which may or may not be part of the first and second code segments), which enable first and second code segments of a system to communicate via medium M. In the view of FIG. 14B, one may consider interface objects I1 and I2 as separate interfaces of the same system and one may also consider that objects I1 and I2 plus medium M comprise the interface. Although FIGS. 14A and 14B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 14A and 14B, but they nonetheless perform a similar function to accomplish the same overall result. We will now briefly describe some illustrative alternative implementations of a programming interface.

A. Factoring

Figure 15A:
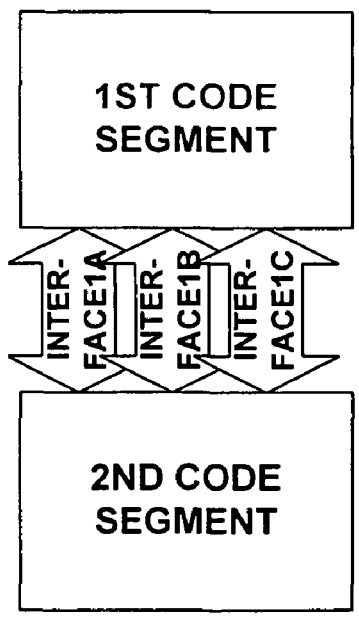
Figure 15B:
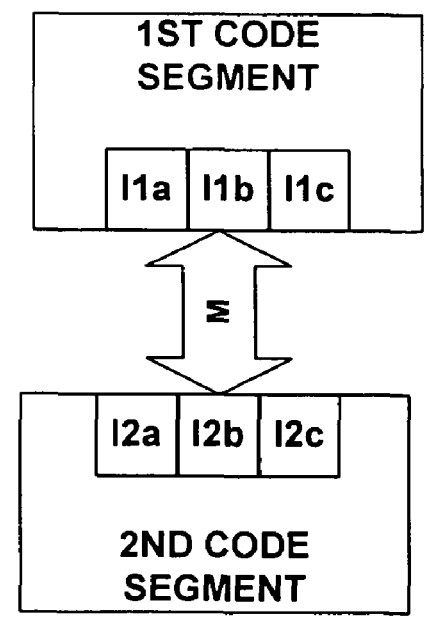

A communication from one code segment to another may be accomplished indirectly by breaking the communication into multiple discrete communications. This is depicted schematically in FIGS. 15A and 15B. As shown, some interfaces can be described in terms of divisible sets of functionality. Thus, the interface functionality of FIGS. 14A and 14B may be factored to achieve the same result, just as one may mathematically provide 24, or 2 times 2 time 3 times 2. Accordingly, as illustrated in FIG. 15A, the function provided by interface Interfac18A may be subdivided to convert the communications of the interface into multiple interfaces Interfac18AA, Interface 1B, Interface 1C, etc. while achieving the same result. As illustrated in FIG. 15B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 15A and 15B, the functional spirit of interfaces Interfac18A and I1 remain the same as with FIGS. 14A and 14B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 16A:
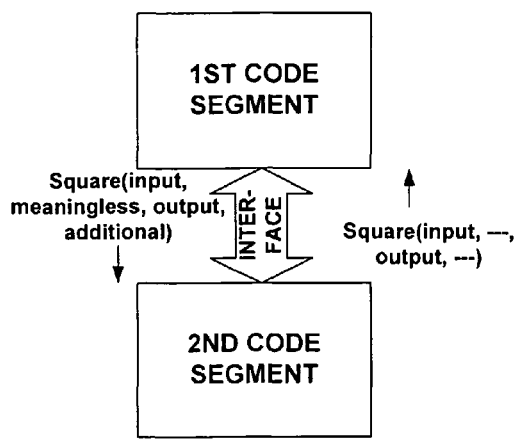
Figure 16B:
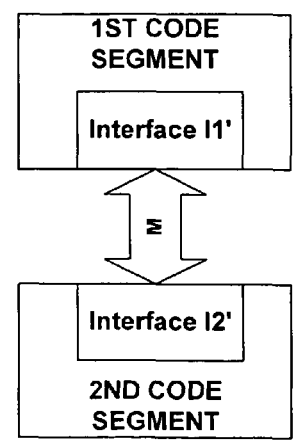

In some cases, it may be possible to ignore, add or redefine certain aspects (e.g., parameters) of a programming interface while still accomplishing the intended result. This is illustrated in FIGS. 16A and 16B. For example, assume interface Interfac18A of FIG. 14A includes a function call Square (input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 16A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 16B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 17A:
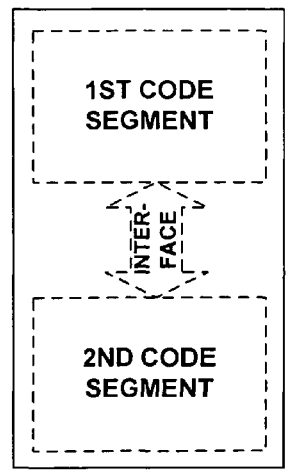
Figure 17B:
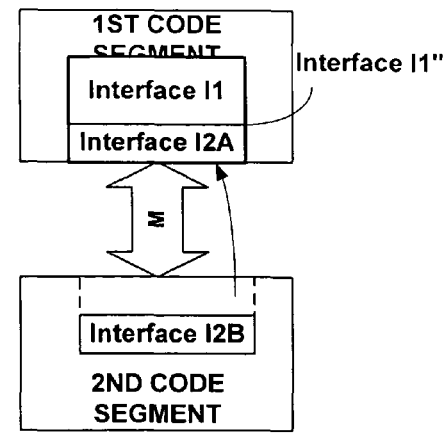

It may also be feasible to merge some or all of the functionality of two separate code modules such that the "interface" between them changes form. For example, the functionality of FIGS. 14A and 14B may be converted to the functionality of FIGS. 17A and 17B, respectively. In FIG. 17A, the previous $1^{st}$ and $2^{nd}$ Code Segments of FIG. 14A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interfac18A may still be in effect. Similarly, shown in FIG. 17B, part (or all) of interface I2 from FIG. 14B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 14B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 18A and 18B. As shown in FIG. 18A, one or more piece(s) of middleware (Divorce Interface(s), since they divorce functionality and/or interface functions from the original interface) are provided to convert the communications on the first interface, Interfac18A, to conform them to a different interface, in this case interfaces Interfac18BA, Interfac18BB and Interfac18BC. This might be done, e.g., where there is an installed base of applications designed to communicate with, say, an operating system in accordance with an Interfac18A protocol, but then the operating system is changed to use a different interface, in this case interfaces Interfac18BA, Interfac18BB and Interfac18BC. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 18B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 14B to a new operating system, while providing the same or similar functional result.

E. Rewriting

Figure 19A:
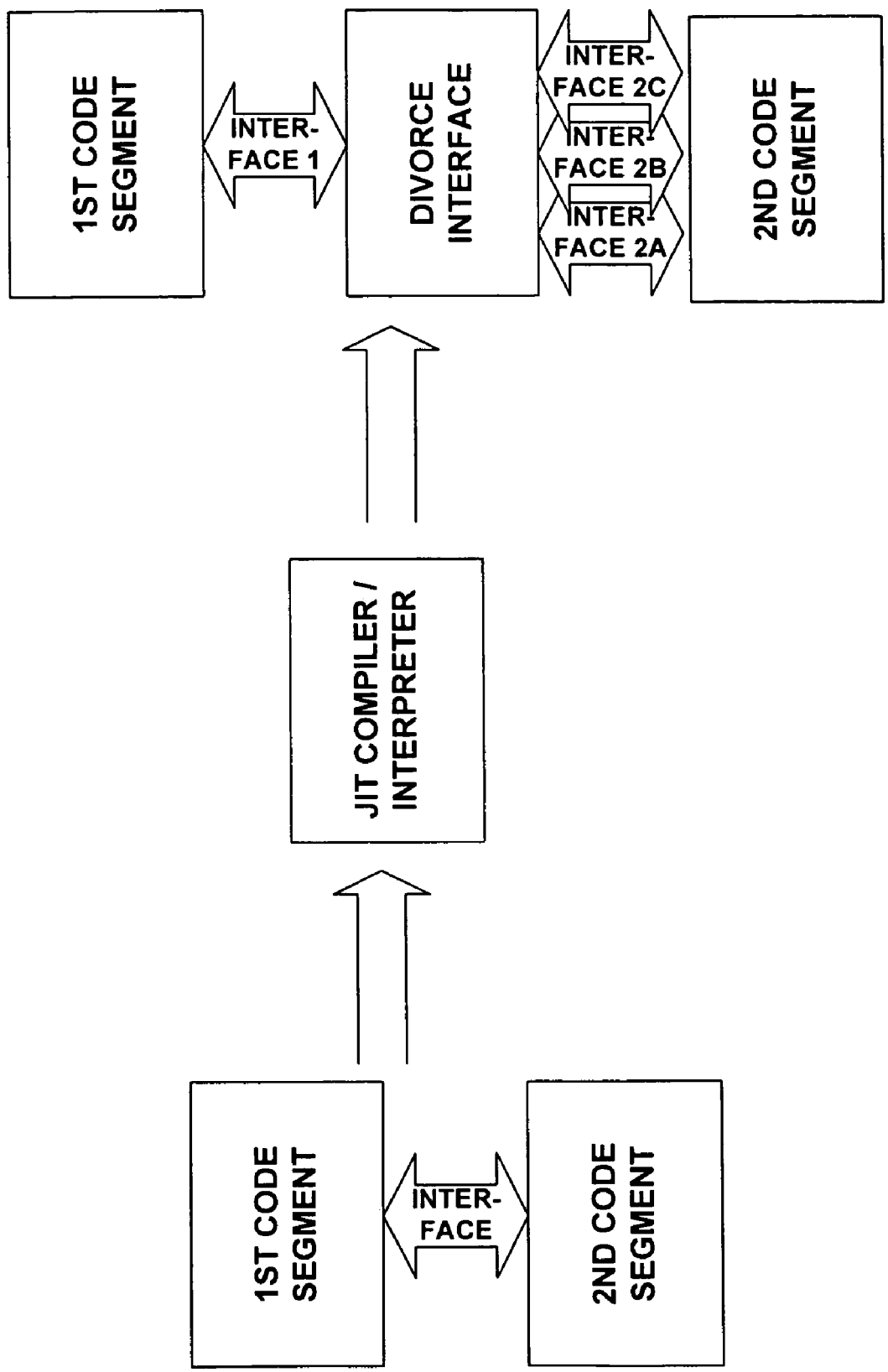
Figure 19B:
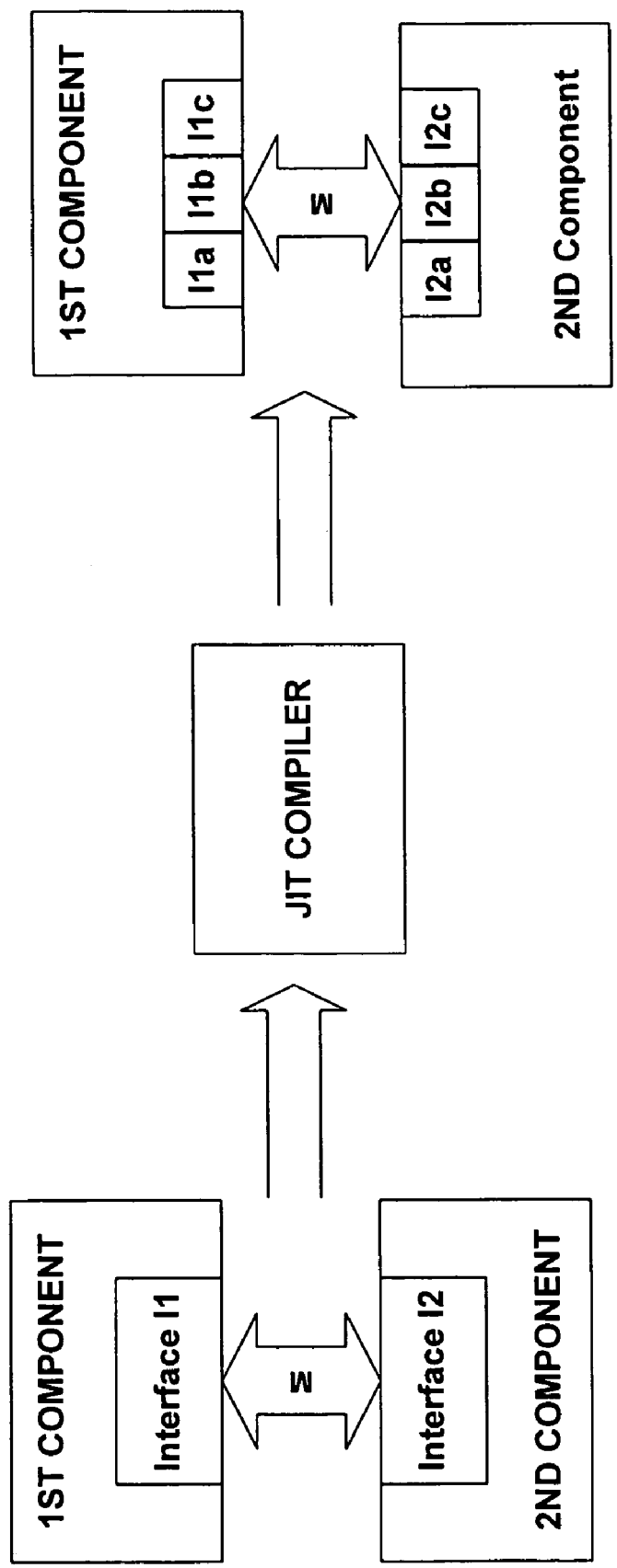

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 19A and 19B. As can be seen in FIG. 19A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 19B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 14A and 14B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use the systems and methods for downloading algorithmic elements to a coprocessor of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to download algorithmic elements to a coprocessor. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the graphics API GAPI of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Gaming consoles, for instance, ever on the cutting edge of graphics rendering are particularly relevant to the flexible and fast coprocessing enabled by the invention.

While exemplary embodiments refer to utilizing the present invention in the context of particular programming language constructs, the invention is not so limited, but rather may be implemented in any language to provide methods for downloading algorithmic elements to a coprocessor. It will be appreciated that while generally vertex shaders have been described herein as operating upon vertex data, and while generally pixel shaders have been described herein as operating upon pixel data, procedural shaders may also be used to process graphics data in other ways where the processing task and associated data can leverage the processing and memory access speed enabled by today's GPUs. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-implemented method for specifying a shader program via an application programming interface (API) of a computing system and for programming a pixel shader of a procedural shader computational subunit of a graphics subsystem to perform according to said shader program, the method including:
   the computing system transmitting the specified shader program to the procedural shader computational subunit;
   the computing system specifying, via the API, at least one instruction of said specified shader program that is executed by the procedural shader computational subunit to compute a rate of change of at least one pixel value in image space relative to a screen display processed by the procedural shader computational subunit; and
   programming, via the API, the pixel shader of the procedural shader computational subunit to perform according to said at least one instruction of said specified shader program.

2. The method of claim 1, wherein said specifying includes specifying, via the API, at least one instruction of said shader program that computes a rate of change in the x-direction of the at least one pixel value processed by the procedural shader computational subunit when the shader program is executed by the procedural shader computational subunit.

3. The method of claim 1, wherein said specifying includes specifying, via the API, at least one instruction of said shader program that computes a rate of change in the y-direction of the at least one pixel value processed by the procedural shader computational subunit when the shader program is executed by the procedural shader computational subunit.

4. The method of claim 1, further comprising tokenizing said shader program to format the shader program for reception by the procedural shader computational subunit.

5. The method of claim 1, further comprising at least one of parsing and compiling said shader program to prepare the shader program for reception by the procedural shader computational subunit.

6. The method of claim 1, further including receiving said at least one pixel value processed by the procedural shader computational subunit in register storage of the procedural shader computational subunit.

7. The method of claim 6, wherein said register storage is specified by the shader program being executed by the procedural shader computational subunit.

8. The method of claim 6, whereby, when executed by the procedural shader computational subunit, the shader program computes the rate of change for the at least one pixel value in register storage, regardless of whether the at least one pixel value is being actively processed by the shader program either due to flow control or due to the at least one pixel being off the edge of a primitive.

9. The method of claim 1, wherein the procedural shader computational subunit is a pixel shader computational subunit and the shader program is a pixel shader program.

10. The method of claim 1, wherein when executed by the procedural shader computational subunit, the shader program computes the rate of change for the at least one pixel value between gradient instructions executed in lockstep and across all of the pixels processed by the procedural shader computational subunit.

11. The method of claim 1, further including the step of specifying, via the API, at least one instruction of said shader program that loads a texture and at least one texture coordinate gradient corresponding to the texture as input for processing by the procedural shader computational subunit when the shader program is executed by the procedural shader computational subunit.

12. The method of claim 11, wherein said at least one texture coordinate gradient includes an x-direction gradient.

13. The method of claim 11, wherein said at least one texture coordinate gradient includes a y-direction gradient.

14. The method of claim 11, wherein said specifying includes specifying, via the API, at least one sampler for sampling the texture.

15. The method of claim 11, wherein said specifying includes specifying a texture including support for mip-mapping.

16. The method of claim 11, wherein said specifying includes specifying a texture including support for level of detail bias.

17. The method of claim 11, wherein the procedural shader computational subunit is a pixel shader computational subunit.

18. A computer readable tangible storage medium having computer executable instructions stored thereon that when executed by a processor cause the processor to implement the method of claim 1.

19. A computer readable tangible storage medium having computer executable instructions stored thereon that when executed by a processor cause the processor to perform the following:
the processor transmitting a shader program to a procedural shader computational subunit of a graphics subsystem;
the processor parsing and compiling said shader program to prepare the shader program for reception by the procedural shader computational subunit;
the processor specifying, via an API, at least one instruction of the shader program that is executed by the procedural shader computational subunit to compute a rate of change of at least one pixel value in image space relative to a screen display processed by the procedural shader computational subunit; and
programming, via the API, the procedural shader computational subunit to perform according to said at least one instruction of said shader program.

20. The computer storage medium of claim 19, wherein when executed by the procedural shader computational subunit, the shader program computes the rate of change for the at least one pixel value between gradient instructions executed in lockstep and across all of the pixels processed by the procedural shader computational subunit.

21. A computing device including:
a processor programmed to implement an application programming interface (API);
means for specifying, via the API, a shader program and for transmitting the shader program to a procedural shader computational subunit of a graphics subsystem, the procedural shader computational subunit comprising a pixel shader that becomes programmed to perform according to said shader program; and
means for specifying, via the API, at least one instruction of said shader program that is executed by the procedural shader computational subunit to compute a rate of change of at least one pixel value in image space relative to a screen display processed by the procedural shader computational subunit.

22. A programmable co-processing unit of a graphics subsystem, including:
a procedural shader computational subunit including a processor that receives a shader program via a graphics application programming interface (API) whereby said procedural shader computational subunit becomes programmed to perform according to said specified shader program, and if a shader program received by the processor of the procedural shader computational subunit includes at least one instruction to compute a rate of change of at least one pixel value in image space relative to a screen display, said at least one instruction, when executed by the shader program, causes the shader program to compute a rate of change of at least one pixel value stored in memory of the procedural shader computational subunit.

23. The programmable co-processing unit of claim 22, wherein the procedural shader computational subunit is a pixel shader computational subunit and the shader program is a pixel shader program.

24. The programmable co-processing unit of claim 22, whereby, when executed, the at least one instruction to compute the rate of change of at least one pixel value causes the shader program to compute a rate of change in the x-direction of said at least one pixel value stored in memory of the procedural shader computational subunit.

25. The programmable co-processing unit of claim 22, whereby, when executed, the at least one instruction to compute the rate of change of at least one pixel value causes the shader program to compute a rate of change in the y-direction of said at least one pixel value stored in memory of the procedural shader computational subunit.

26. The programmable co-processing unit of claim 22, wherein said memory is register storage of the procedural shader computational subunit.

27. A graphics card comprising the programmable co-processing unit of claim 22.

28. A computer-implemented method that specifies a vertex shader program via an application programming interface (API) of a computing system and programs a vertex shader of a vertex shader computational subunit of a graphics subsystem of the computing system to perform according to said vertex shader program, the method including:
the computing system specifying, via the API, at least one instruction of said vertex shader program that samples a texture in video memory when the vertex shader program is executed by the vertex shader computational subunit;
transmitting, via the API, the specified vertex shader program to the vertex shader computational subunit; and
programming, via the API, the vertex shader of the vertex shader computational subunit to perform according to said at least one instruction of said vertex shader program.

29. The method of claim 28, wherein said specifying includes specifying a sampler for sampling the texture.

30. The method of claim 29, further comprising indicating what types of filters are legal at said texture sampler.

31. The method of claim 30, further comprising indicating that a software transformation and lighting filter is supported by said vertex shader.

32. The method of claim 28, wherein said specifying includes specifying a texture including support for mip-mapping.

33. The method of claim 28, wherein said specifying includes specifying a texture including support for level of detail bias.

34. A computer readable tangible storage medium having computer executable instructions stored thereon that when executed by a processor cause the processor to implement the method of claim 28.

35. The method of claim 28, wherein said vertex shader includes sufficient memory to store displacement maps, further comprising supplying at least one displacement map as input for processing of the texture by the vertex shader computational subunit.

36. The method of claim 28, wherein the at least one instruction of said vertex shader program comprises a texture sample instruction that when processed by said vertex shader computational subunit samples a texture at one of four separate texture sampler stages.

37. The method of claim 36, further comprising reading from said four separate texture sampler stages in a single pass of said vertex shader.

38. The method of claim 36, further comprising programming the four separate texture sampler stages via a set sampler state API of the computing system.

39. The method of claim 28, further comprising checking whether support exists for a particular texture format via a check device format API of the computing system.

40. A programmable co-processing unit of a graphics subsystem, including:
a vertex shader computational subunit including a processor that receives a vertex shader program via a graphics application programming interface (API) and said processor executes the vertex shader program, whereby if the vertex shader program received by the processor of the vertex shader computational subunit includes at least one texture sampling instruction, said at least one texture sampling instruction, when executed by the processor of the vertex shader program of the vertex shader computational subunit, causes the vertex shader program to sample a texture in video memory.

41. A graphics card comprising the programmable co-processing unit of claim 40.

42. A computing system including:
a video memory having a texture; and
a processor programmed to implement an application programming interface (API) that specifies and transmits a vertex shader program to a vertex shader computational subunit of a graphics subsystem of the computing system, said vertex shader computational subunit comprising a vertex shader that becomes programmed to perform according to said vertex shader program, the API specifying at least one instruction of said vertex shader program that samples said texture in said video memory when the vertex shader program is executed by the vertex shader computational subunit.

43. The computing system of claim 42, wherein said API specifies a sampler for sampling the texture.

44. The computing system of claim 43, further comprising means for indicating what types of filters are legal at said texture sampler.

45. The computing system of claim 44, wherein said indicating means indicates that a software transformation and lighting filter is supported by said vertex shader.

46. The computing system of claim 42, wherein said vertex shader includes sufficient memory to store displacement maps, further comprising means for supplying at least one displacement map as input for processing of the texture by the vertex shader computational subunit.

47. The computing system of claim 42, wherein the at least one instruction of said vertex shader program comprises a texture sample instruction that when processed by said vertex shader computational subunit samples a texture at one of four separate texture sampler stages.

48. The computing system of claim 47, wherein said vertex shader reads from said four separate texture sampler stages in a single pass.

49. The computing system of claim 47, further comprising a set sampler state API of the computing system for programming the four separate texture sampler stages.

50. The computing system of claim 42, further comprising a check device format API of the computing system for checking whether support exists for a particular texture format.

51. A computer-implemented method for specifying a shader program via an application programming interface (API) of a computing system and for programming a shader of a procedural shader computational subunit of a graphics subsystem of the computing system to perform according to said shader program, the method including:
the computing system specifying, via the API, at least one instruction of said shader program that loads a texture and at least one texture coordinate gradient corresponding to the texture as input for processing by the procedural shader computational subunit when the shader program is executed by the procedural shader computational subunit;
transmitting, via the API, the specified shader program to the procedural shader computational subunit; and
programming, via the API, the shader of the procedural shader computational subunit to perform according to said at least one instruction of said specified shader program.

52. The method of claim 51, wherein said at least one texture coordinate gradient includes an x-direction gradient.

53. The method of claim 51, wherein said at least one texture coordinate gradient includes a y-direction gradient.

54. The method of claim 51, wherein said specifying includes specifying, via the API, at least one sampler for sampling the texture.

55. The method of claim 51, wherein said specifying includes specifying a texture including support for mip-mapping.

56. The method of claim 51, wherein said specifying includes specifying a texture including support for level of detail bias.

57. The method of claim 51, wherein the procedural shader computational subunit is a pixel shader computational subunit.

58. A computer readable tangible storage medium having computer executable instructions stored thereon that when executed by a processor cause the processor to implement the method of claim 51.

59. A computer readable tangible storage medium having computer executable instructions stored thereon that when executed by a processor cause the processor to perform the following:
transmitting a pixel shader program to a pixel shader computational subunit of a graphics subsystem of the computer whereby said pixel shader computational subunit becomes programmed to perform according to said pixel shader program;
specifying at least one instruction of said pixel shader program that computes a gradient in image space of at least one value stored in memory of the pixel shader computational subunit when the pixel shader program is executed by the pixel shader computational subunit; and
specifying, via an API, at least one instruction of the pixel shader program that loads a texture and at least one texture coordinate gradient corresponding to the texture as input for processing by the pixel shader computational subunit when the pixel shader program is executed by the pixel shader computational subunit.

60. A computing device comprising:
a processor programmed to implement an application programming interface (API);
means for specifying, via the API, a shader program and for transmitting the shader program to a procedural shader computational subunit of a graphics subsystem of the computing device, said procedural shader computational subunit comprising a shader that becomes programmed to perform according to said shader program; and
means for specifying, via the API, at least one instruction of said shader program that loads a texture and at least one texture coordinate gradient corresponding to the texture as input for processing by the procedural shader computational subunit when the shader program is executed by the procedural shader computational subunit.

61. The computing device of claim 60, wherein the procedural shader computational subunit is a pixel shader computational subunit.

62. The computing device of claim 60, wherein said at least one texture coordinate gradient includes at least one of an x-direction gradient or a y-direction gradient.

63. The computing device of claim 60, wherein said means for specifying said at least one instruction of the shader program includes means for specifying at least one sampler for sampling said texture.

64. A computing device including:
a processor programmed to implement an application programming interface (API);
means for specifying, via the API, a vertex shader program and for transmitting the vertex shader program to a vertex shader computational subunit of a graphics subsystem of the computing system, said vertex shader computational subunit comprising a vertex shader that becomes programmed to perform according to said vertex shader program; and
means for specifying, via the API, at least one instruction of said vertex shader program that samples a texture in video memory when the vertex shader program is executed by the vertex shader computational subunit.

65. A computer readable tangible storage medium having computer executable instructions stored thereon that when executed by a processor cause the processor to perform the following:
transmitting a vertex shader program to a vertex shader computational subunit of a graphics subsystem of the computer, said vertex shader computational subunit comprising a vertex shader that becomes programmed to perform according to said vertex shader program; and
specifying, via an application programming interface, at least one instruction of said vertex shader program that samples a texture in video memory when the vertex shader program is executed by the vertex shader computational subunit.

66. A programmable co-processing unit of a graphics subsystem, including:
a procedural shader computational subunit including a processor that receives a shader program via a graphics application programming interface (API), and executes the shader program, whereby if shader program received by the processor of the procedural shader computational subunit includes at least one instruction that loads a texture and at least one texture coordinate gradient corresponding to the texture as input for processing, said at least one instruction, when executed by the shader program of the procedural shader computational subunit, causes the shader program to load a texture into video memory.

67. A graphics card comprising the programmable co-processing unit of claim 66.

* * * * *